United States Patent
Shimazaki et al.

(10) Patent No.: US 6,556,457 B1
(45) Date of Patent: Apr. 29, 2003

(54) METHOD OF CONTROLLING INVERTER POWER GENERATION APPARATUS

(75) Inventors: Mitsuyoshi Shimazaki, Numazu (JP); Kaoru Shinba, Numazu (JP); Masanori Nakagawa, Numazu (JP)

(73) Assignee: Kokusan Denki Co., Ltd., Shizuoka-Ken (JP)

( * ) Notice: Subject to any disclaimer, the term of this patent is extended or adjusted under 35 U.S.C. 154(b) by 0 days.

(21) Appl. No.: 10/037,650

(22) Filed: Jan. 3, 2002

(51) Int. Cl.[7] .............................................. H02M 5/458
(52) U.S. Cl. .......................................... 363/34; 363/37
(58) Field of Search .............................. 363/34, 37, 97, 363/131

(56) References Cited

U.S. PATENT DOCUMENTS

| | | | | |
|---|---|---|---|---|
| 3,986,098 A | * | 10/1976 | Tamii et al. | 363/135 |
| 4,833,584 A | * | 5/1989 | Divan | 363/37 |
| 4,843,202 A | * | 6/1989 | Smith et al. | 219/716 |
| 4,894,763 A | * | 1/1990 | Ngo | 363/35 |
| 5,315,497 A | * | 5/1994 | Severinsky | 363/34 |
| 5,907,223 A | * | 5/1999 | Gu et al. | 315/247 |
| 5,914,572 A | * | 6/1999 | Qian et al. | 315/307 |
| 6,118,678 A | * | 9/2000 | Limpaecher et al. | 363/60 |
| 6,166,513 A | * | 12/2000 | Hammond | 318/764 |
| 6,278,622 B1 | | 8/2001 | Shimazaki et al. | |
| 6,317,369 B1 | | 11/2001 | Shimazaki et al. | |

FOREIGN PATENT DOCUMENTS

| | | |
|---|---|---|
| JP | 11-182294 | 6/1999 |
| JP | 11-284277 | 10/1999 |

* cited by examiner

Primary Examiner—Adolf Deneke Berhane
(74) Attorney, Agent, or Firm—Pearne & Gordon, LLP

(57) ABSTRACT

A method of controlling a parallel operation of two inverter power generation apparatuses wherein an unbalance of outputs from the two inverter power generation apparatuses is cancelled by judging that the outputs of the two inverter power generation apparatuses have the collapse of the balance between them when a DC power supply voltage obtained from a DC power supply section exceeds a judgment value set at a value equal to or more than a non-load output voltage of the DC power supply section and allowing an overload operation of the inverter power generation apparatus of higher output voltage among the two inverter power generation apparatuses so as to lower the output voltage of the corresponding inverter power generation apparatus.

7 Claims, 12 Drawing Sheets

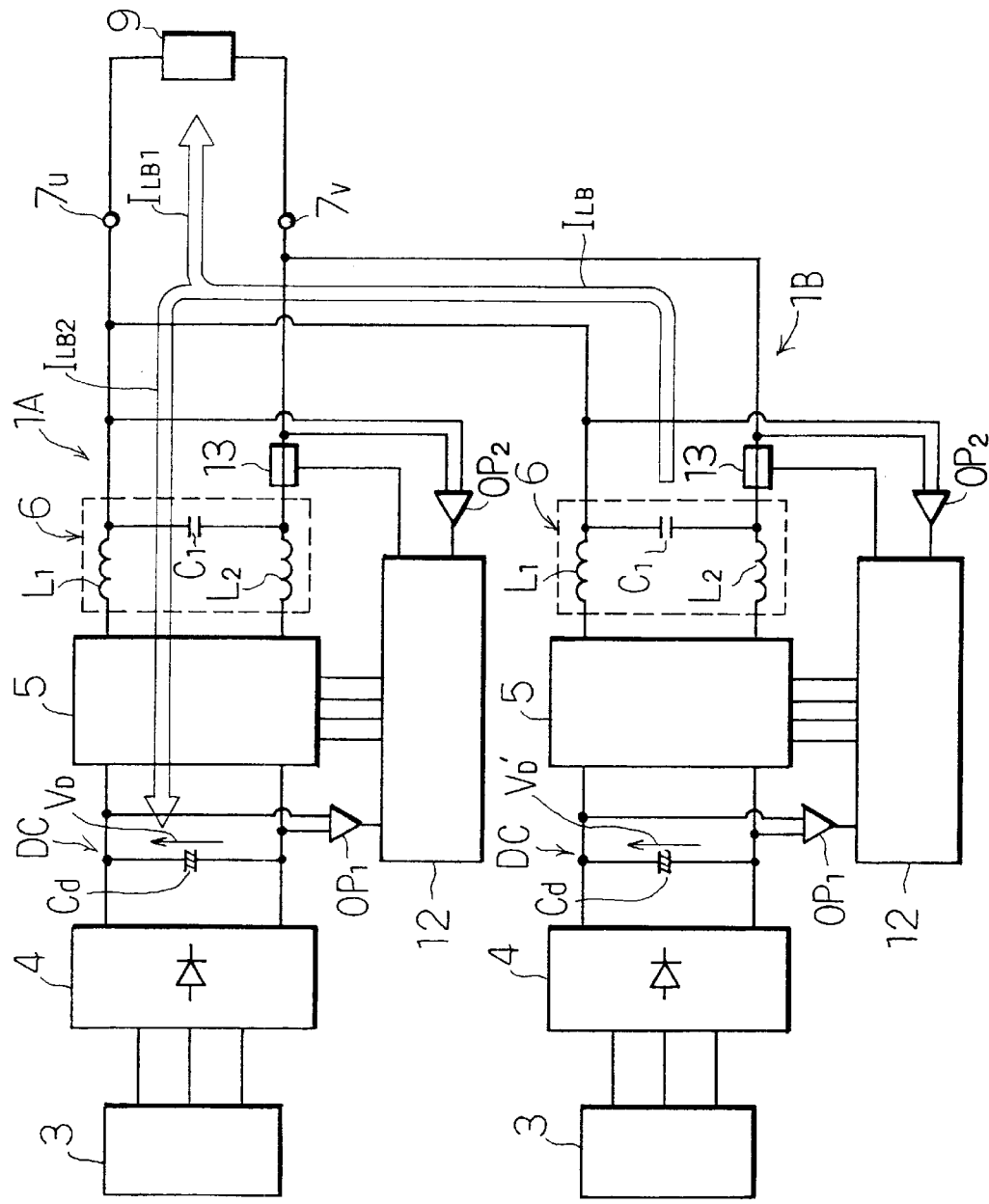

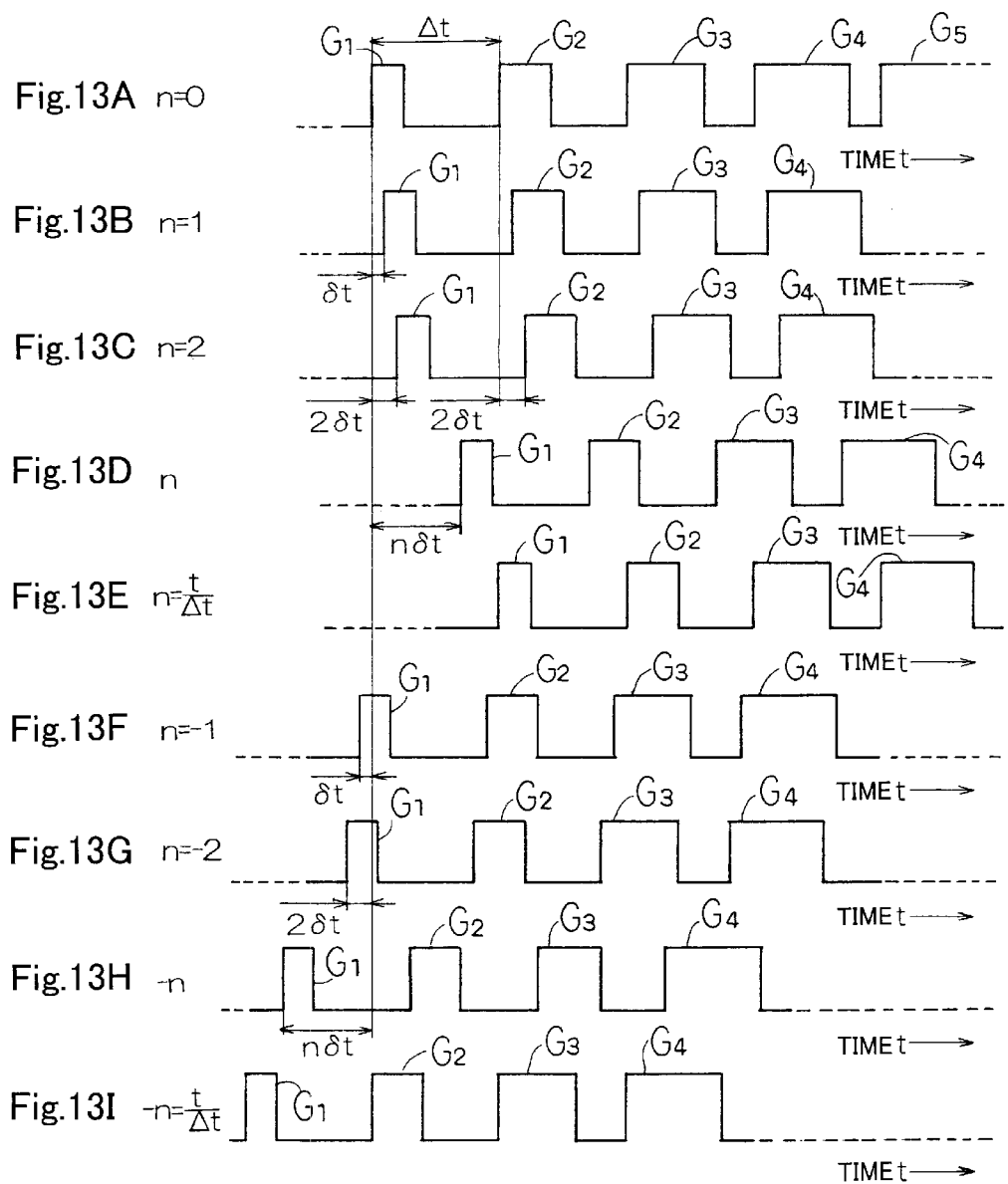

METHOD OF CONTROLLING INVERTER POWER GENERATION APPARATUS

TECHNICAL FIELD OF THE INVENTION

This invention relates to a method of controlling an inverter power generation apparatus having an inverter circuit to convert an output of an AC generator into an AC output of arbitrary frequency when it is operated in parallel to other power supply.

BACKGROUND OF THE INVENTION

An inverter power generation apparatus has been used for a power generation apparatus driven by an internal combustion engine as a primer.

In general, the inverter power generation apparatus comprises an AC generator driven by the internal combustion engine, a DC power supply section to convert an output voltage of the AC generator into a DC voltage, an inverter circuit to convert an output voltage of the DC power supply section into an AC output of predetermined frequency, a filter circuit to remove a harmonic component from an output of the inverter circuit, load connection terminals having an output of the filter circuit applied and a controller having PWM control means to control the inverter circuit in the form of pulse width modulation (referred to as PWM later) so as to output the AC voltage of predetermined waveform through the load connection terminals. In many cases, the controller is provided with overload protection means to stop the output of the inverter circuit when an overload current flows through the inverter circuit and the filter circuits in order to protect them.

The DC power supply section comprises a rectifier to rectify the output of the AC generator and a smoothing capacitor connected across the DC output terminals of the rectifier to generate a DC voltage across the smoothing capacitor.

The generally used inverter circuit comprises a bridge type switch circuit having a plural of switch arms connected in parallel to each other and each having an upper arm switch element and a lower arm switch element connected in series to each other. A pair of DC input terminals are led out of a common connection point of both ends of the switch arms while AC output terminals are led out of the connection point of the corresponding switch elements of each of the switch arms.

This inverter circuit has feedback diodes provided corresponding to the switch elements and connected in reverse parallel to the corresponding switch elements, respectively. Thus, A diode bridge full wave rectifier circuit is formed by the feedback diodes as viewed on the AC output terminals of the inverter circuit.

The PWM control means of the controller serves to output from the inverter circuit the AC voltage of intermittent waveform having a duty value "D" changing for every PWM cycle in accordance with an instant value of the AC output voltage applied through the load connection terminals to a load by carrying out the on-off operation of the pair of switch elements located at the diagonal position of the bridge of the inverter circuit at predetermined timing with a PWM signal of, pulse waveform applied to the pair of the switch elements.

The duty value "D" of the PWM control can be determined by multiplying a correction coefficient Kv by a reference duty value "Do" required for making a waveform of an AC output voltage to be output from the load connection terminals into predetermined waveform. In general, a ratio VA/VD of a rated value VA of the AC output voltage obtained across the load connection terminals to a DC power supply voltage VD is used for the correction coefficient Kv.

The AC voltage output from the inverter circuit is converted into an AC output voltage of smooth waveform having the harmonic component removed by the filter circuit.

The overload protection means provided in the controller controls the inverter circuit to stop the operation of the inverter when the load current equal to or more than the overload judgment current value flows through the load connection terminals whereby the switch elements of the inverter circuit is protected from the overload current.

With the inverter generator apparatus, since the DC voltage output from the DC power supply section is converted into the AC voltage of arbitrary frequency by controlling the inverter circuit, the AC voltage of predetermined frequency can be obtained from the load connection terminals in spite of what the revolution of the generator is. Also, the AC voltage of arbitrary magnitude can be obtained by controlling the duty value changing for every PWM cycle in the PWM control.

In case that the volume of the load is large, the aforementioned inverter power generation apparatus is sometimes required to be operated in parallel to the other AC power supply apparatus (referred to as an external AC power supply later). What is meant by "the external AC power supply" may be another inverter power generation apparatus formed in the same manner, an AC generator to generate an output voltage of frequency identical to that of the inverter power generation apparatus or a commercial AC power supply.

When the inverter power generation apparatus and the external AC power supply are operated in parallel to each other, the load connection terminals of both the inverter power generation apparatus and the external AC power supply are connected to each other and the electric power is simultaneously supplied from the inverter power generation apparatus and the external AC power supply to the load. In this case, the voltages generated by the inverter power generation apparatus and the external AC power supply are required to have a waveform, a crest value and a phase identical to each other.

Thus, in case that the inverter power generation apparatus and the external AC power supply are operated in parallel to each other, when the AC voltage is applied between the load connection terminals from the external power supply, the controller should control the inverter power generation apparatus so that the waveform, the crest value and the phase of the output voltage of the inverter power generation apparatus are coincident with those of the voltage applied from the external power supply In the specification, it is premised that the external power supply having the output frequency equal to the output frequency of the inverter power generation apparatus is selected when they are operated in parallel to each other. In other words, it is premised that the output frequencies of the inverter power generation apparatus and the external AC power supply are coincident with each other.

The applicant has proposed an inverter power generation apparatus adapted to control an inverter circuit so that a waveform, a crest value and a phase of an AC output voltage applied across load connection terminals from the inverter circuit are coincident with those of an AC voltage applied from the external AC power supply from which the AC voltage is applied across the load connection terminals, which is disclosed in JP11-182294 and JP11-284277.

In the invention of JP11-182294, when an overcurrent flows through the inverter power generation apparatus, the output of the inverter power generation apparatus is once stopped and it is judged whether the overcurrent is caused by the overload or by the external AC power supply connected across the load connection terminals. When it is judged that the overcurrent is caused by the overload, the output of the inverter power generation apparatus is kept stopped and when it is judged that the overcurrent is caused by the voltage applied from the external AC power supply across the load connection terminals, the output of the inverter power generation apparatus is restored after the waveform, the crest value and the phase of the AC output voltage applied across the load connection terminals from the inverter circuit are made coincident with those of the AC voltage applied from the external AC power supply.

In the inverter power generation apparatus shown in JP11-284277, in case that the inverter circuit is controlled so as to output an AC output voltage of reference waveform from the inverter circuit through the load connection terminals, the difference between the phases of the reference waveform and the waveform of the actual output across the load connection terminals is detected and when the phase difference is beyond the set range, the phase of the AC voltage applied from the inverter circuit across the load connection terminals is so controlled as to be coincident with that of the AC voltage applied from the external power supply by shifting the phase of the reference waveform.

With the aforementioned control performed, in almost all cases, the parallel operation of the inverter power generation apparatus and the external power supply can be accomplished without any trouble. However, the aforementioned control is performed so that the waveform, the crest value and the phase of the output voltage of the inverter power generation apparatus are corrected in accordance with the information of the voltage applied from the external power supply across the load connection terminals, but not performed so that the waveform, the crest value and the phase of the output voltage of the inverter power generation apparatus are always coincident with those of the voltage applied from the external power supply by synchronizing the inverter power generation apparatus and the external AC power supply. Thus, it is hard that the balance between the output voltage of the inverter power generation apparatus and the voltage applied from the external AC power supply is fully prevented from being lost.

In the condition where the inverter power generation apparatus and the external AC power supply are operated in parallel to each other, when the crest values and the phases of the output voltage of the inverter power generation apparatus and those of the output voltage of the external AC power supply are shifted by any cause so that the balance between the outputs of the inverter power generation apparatus and the external AC power supply collapses. In some cases, the current is caused to flow from the side of the external AC power supply via the load connection terminals through the inverter power generation apparatus due to the collapse of the balance. This causes the inverter power generation apparatus to serve as a load to the external AC power supply and therefore since the electric power cannot be supplied from the inverter power generation apparatus to the load, the object of the parallel operation in which the electric power is supplied from the two power supplies cannot be accomplished.

As the current flows from the external AC power supply through the inverter power generation apparatus, the smoothing capacitor of the DC power supply section is charged through the full-wave rectifier circuit formed by the feedback diodes provided in the inverter circuit and therefore the output voltage of the DC power supply section increases. At that time, since the correction coefficient Kv for determining the duty value decreases, the duty value for the PWM control decreases so that the output voltage of the inverter power generation apparatus decreases. Thus, since the current flowing from the side of the external AC power supply through the inverter circuit further increases. This enhances the unbalance between the output of the inverter power generation apparatus and the output of the external AC power supply and therefore the parallel operation of the inverter power generation apparatus and the external AC power supply gets fully meaningless. Also, since the inverter power generation apparatus serves as the load to the external AC power supply and the latter gets the state of overload, in case that there is provided means to limit the load current in the external AC power supply, the output of the external AC power supply is sometimes interrupted so that the electrical conduction to the load is stopped.

SUMMARY OF THE INVENTION

Accordingly, it is a principal object of the invention to provide a method of controlling an inverter power generation apparatus adapted to being operated in parallel with an external AC power supply without any trouble so that any current is prevented from flowing from the external AC power supply through the inverter power generation apparatus.

The invention is applied to a method of controlling a parallel operation of two inverter power generation apparatuses each comprising an AC generator, a DC power supply section having a rectifier to rectify an output of the AC generator and a smoothing capacitor connected across DC output terminals of the rectifier circuit, an inverter circuit having on-off controllable switch elements to convert a DC output voltage of the DC power supply section into an AC voltage by switching an operation of the switch elements, a filter circuit to remove a harmonic component from an output from the inverter circuit, load connection terminals having the output of the filter circuit applied whereby the inverter circuit is so controlled as to output the AC voltage of predetermined waveform through the load connection terminals when no voltage is applied from the external AC power supply across the load connection terminals and when the voltage is applied from the external AC power supply across the load connection terminals, a waveform, a crest value and a phase of the AC voltage output from the filter circuit are coincident with those of the AC voltage applied from the external AC power supply, respectively.

The method of the invention controls the two inverter power generation apparatuses by detecting the DC power supply voltage of each of the two inverter power generation apparatuses, limiting a load current of each of the inverter power generation apparatuses to a value equal to or less than the maximum rated load current allowed for outputting the AC voltage of waveform having no distortion from each of the inverter power generation apparatuses when both of the detected DC power supply voltages of the two inverter power generation apparatuses are equal to or less than a judgment value set at a value equal to or more than a non-load output voltage of the DC power supply section of the corresponding generation apparatuses and allowing the load current of one of the inverter power generation apparatuses to exceed the value of the maximum rated load current when the DC power supply voltage of the other inverter power generation apparatuses exceeds the judgment value.

In general, the AC generator has a characteristic in which the output voltage gets lowered as the output current increases. Thus, the DC power supply voltage of the inverter power generation apparatus increases as the load current decreases and gets approximately equal to the crest value of the no-load output voltage of the AC generator when non-loaded. In the normal state where no current flows from the side of the load connection terminals of the inverter power generation apparatus to the side of the DC power supply section, the DC power supply voltage never exceeds the no-load output voltage of the AC generator.

On the other hand, as the current flows from one of the inverter power generation apparatuses to the other inverter power generation apparatus when the balance between the output voltages of the two inverter power generation apparatuses collapses due to any cause, the smoothing capacitor of the former inverter power generation apparatus is charged by the current. Thus, the output voltage (the DC power supply voltage) of the DC power supply section is higher than the no-load output voltage of the DC power supply section.

Accordingly, with the DC power supply voltage of each of the inverter power generation apparatuses detected and whether the DC power supply voltage is equal to or less than the judgment value set at the value equal to or more than the no-load output voltage of the DC power supply section or not judged as aforementioned, whether there collapses the balance between the output of the inverter power generation apparatus and the output of the external AC power supply or not (whether the current flows to one of the inverter power generation apparatuses from the other inverter power generation apparatus or not) can be judged.

In this manner, when it is judged that the current flows to one of the inverter power generation apparatuses from the other inverter power generation apparatus, the load current of the other inverter power generation apparatus is so controlled as to be allowed to exceed the value of the maximum rated load current, which causes the output voltage of the other inverter power generation apparatus to be lowered by the overload current. Thus, the current no longer flows to one of the inverter power generation apparatuses from the other inverter power generation apparatus and therefore, the DC power supply voltage of the one inverter power generation apparatus decreases. Thus, the load current flows from the one inverter power generation apparatus as well and as a result, the parallel operation of the two inverter power generation apparatuses can be restored.

When both of the load current of the two inverter power generation apparatuses get excessive, the outputs of these inverter power generation apparatuses are stopped and therefore the overcurrent can be prevented from flowing.

In a preferred-embodiment, there is provided a controller to perform a PWM control in which a PWM signal is applied to the control terminals of the switch elements of the inverter circuit so as to output from the inverter circuit the AC voltage of intermittent waveform having the duty value varying for every PWM cycle in accordance with an instant value of the AC output voltage applied to the load through the load connection terminals and an overload protection control in which the output of the inverter circuit is stopped when the value of the DC power supply voltage is lower than the overload judgment voltage value.

In case that the inverter power generation apparatus the invention is applied to is provided with the aforementioned controller, it is so constructed as to control so that the waveform, the crest value and the phase of the AC output voltage applied across the load connection terminals from the inverter circuit when the external AC voltage is applied from the external AC power supply to the load connection terminals is made coincident with those of the external AC power supply voltage and performs the power supply voltage judgment step in which whether the detected DC power supply voltage of each of the inverter power generation apparatuses is equal to or less than the judgment value or not is judged.

When it is judged in the power supply voltage judgment step that the DC power supply voltage is equal to or less than the judgment value, with the value of the DC power supply voltage when the maximum rated load current allowed for outputting the AC voltage having no waveform distortion through the load connection terminals of each of the inverter power generation apparatus flows through the inverter circuit of each of the inverter power generation apparatus to the side of the load determined as the value of the minimum power supply voltage in the steady state, the value of the overload judgment voltage for the overload protection control of each of the inverter power generation apparatuses is set at a value equal to the value of the steady state minimum power supply voltage so that the load current of each of the inverter power generation apparatuses is prohibited from exceeding the value of the maximum rated load current. When it is judged in the power supply voltage judgment step that the DC power supply voltage of one of the inverter power generation apparatuses exceeds the judgment value, the value of the overload judgment voltage for the overload protection control of the other inverter power generation apparatus is set at a value further lower than the value of the steady state minimum power supply voltage so that the overload operation of the other inverter power generation apparatus is allowed.

Although, in the aforementioned embodiment, the overload state is determined by detecting the DC power supply voltage, the overload protection control can be performed so that the output of the inverter circuit is stopped when it is judged that the load current exceeding the value of the overload judgment current flows from the inverter circuit by detecting the load current of each of the inverter power generation apparatuses.

In case that the inverter power generation apparatus the invention is applied to is controlled as aforementioned, when it is judged in the power supply voltage judgment step that the DC power supply voltages of the two inverter power generation apparatuses are equal to or less than the judgment value set at the value equal to or more than the no-load output voltage of the corresponding DC power supply section, a value of a overload judgment current of each of the inverter power generation apparatuses is set at the value equal to the value of the steady state maximum rated load current allowed for outputting the AC output voltage having no waveform distortion from the corresponding inverter power generation apparatus so that the load current of each of the inverter power generation apparatuses is prohibited from exceeding the value of the maximum rated load current. When it is judged in the power supply voltage judgment step that the DC power supply voltage of either of the inverter power generation apparatuses exceeds the judgment value, the value of the overload judgment current of the other inverter power generation apparatus is set at the value larger than the value of the maximum rated load current so that the overload operation of the other inverter power generation apparatus in which the load current thereof exceeds the maximum rated load current is allowed.

In the inverter power generation apparatus proposed by the applicant, the PWM control makes as the duty value "D" the value obtained by multiplying by the correction coefficient Kv the reference duty value "Do" required for obtaining the predetermined waveform of the AC output voltage output from the load connection terminals and the controller is so formed that the waveform, the crest value and the phase of the AC output voltage applied across the load connection terminals from the inverter circuit when the external AC voltage is applied from the external AC power supply across the load connection terminals are made coincident with those of the external AC voltage.

In case that the invention is applied to the inverter power generation apparatus having the controller aforementioned, there are used AC generators having the same characteristic for the two inverter power generation apparatuses and it is judged whether the detected DC power supply voltages of the two inverter power generation apparatuses are equal to or less than the judgment value set at the value equal to or more than the no-load output voltage of the DC power supply section of the corresponding inverter power generation apparatuses or not. It is judged in the power supply judgment step that both of the DC power supply voltages of the two inverter power generation apparatuses are equal to or less than the corresponding judgment value, ratios of the rated value VA of the crest value of the AC voltage output through the load connection terminals relative to the respective DC power supply voltages VD and VD' of the two inverter power generation apparatuses which can be expressed by VA/VD and VA/VD', respectively are used as the correction coefficient Kv for the PWM control of the two inverter power generation apparatuses, respectively. When it is judged in the power supply voltage judgment step that the DC power supply voltage VD of one of the inverter power generation apparatuses exceeds the judgment value, the ratio VA/VD' of the rated value VA of the crest value of the voltage across the load connection terminals relative to the DC power supply voltage VD' of the other inverter power generation apparatus is used as the correction coefficient Kv for the PWM control of the one inverter power generation apparatus.

In this manner, since when it is judged that the DC power supply voltage of one of the inverter power generation apparatuses exceeds the judgment value equal to or more than the crest value of the no-load output voltage of the AC generator; that is, when the load current of the other inverter power generation apparatus flows through the one inverter power generation apparatus, for the correction coefficient Kv by which the reference duty value is multiplied for determining the duty value for the PWM control of the one inverter power generation apparatus (the inverter power generation apparatus to which the current flows from the side of the load connection terminals to the side of the DC power supply section) is used the ratio VA/VD' of the rated value of the crest value of the AC output voltage applied to the load through the load connection terminals relative to the DC power supply voltage VD' of the other inverter power generation apparatus, the duty values of the PWM signals applied to the inverter circuits of the two inverter power generation apparatuses can get equal to each other and therefore the unbalance between the outputs of the two inverter power generation apparatuses can be cancelled so that the current can be prevented from flowing to the one inverter power generation apparatus from the other inverter power generation apparatus.

The invention may perform the simultaneous PWM control of the two inverter power generation apparatuses by applying a timing signal for determining a start timing of every PWM cycle of the PWM control made for one of the two inverter power generation apparatuses to the other inverter power generation apparatus and determining the start timing of every PWM cycle of the PWM control made for the other inverter power generation apparatus on the timing signal applied from the one inverter power generation apparatus. Since the outputs of the two inverter power generation apparatuses can be always balanced by performing this control, the state where the current flows from the one inverter power generation apparatus to the other inverter power generation apparatus due to the collapse of the balance between the outputs of the two inverter power generation apparatuses can be prevented and the parallel operation of the two inverter power generation apparatuses can be performed without any trouble.

In case that this control is made, the overload state may be judged for the overload protection control either by detecting the output voltage of the DC power supply section or by detecting the load current.

Also, in the invention, when it is judged in the power supply judgment step that the DC power supply voltage is equal to or less than a judgment value set at a value equal to or more than the crest value of the no-load output voltage of the AC generator, for the correction coefficient Kv may be used the ratio VA/VD of the rated value VA of the crest value of the voltage output through the load connection terminals relative to the DC power supply voltage VD of each of the inverter power generation apparatuses and when it is judged in the power supply judgment step that the DC power supply voltage exceeds the judgment value set at the value equal to or more than the crest value of the no-load output voltage of the AC generator, for the correction coefficient Kv may be used the ratio VA/VDo of the rated value VA relative to a provisional DC power supply voltage VDo set at a value equal to or less than the no-load voltage Vo of the AC generator.

As the ratio VA/VDo of the rated value VA relative to the provisional DC power supply voltage VDo set at the value equal to or less than the no-load voltage Vo of the AC generator is used for the correction coefficient Kv for arithmetically operating the duty value of the PWM signal when the DC power supply voltage of the inverter power generation apparatus exceeds the judgment value set at the value equal to or more than the crest value of the no-load voltage because the state where the current flows from the external AC power supply through the load connection terminals into the side of the inverter circuit occurs due to any cause, the state where the load current of the inverter power generation apparatus is made zero or some current flows arises whereby the current can be avoided from flowing through the inverter power generation apparatus in a reverse direction. At that time, since the load current of the external AC power supply operated in parallel to the inverter power generation apparatus is fully consumed by the load, the load current of the external AC power supply increases and the output voltage thereof is lowered. As the output of the external AC power supply is lowered, the DC power supply voltage of the inverter power generation apparatus is lowered and therefore the normal state where the current is supplied from both of the inverter power generation apparatus and the external AC power supply is restored. In this case, the external AC power supply to be operated in parallel to the inverter power generation apparatus may be the inverter power generation apparatus having the same construction, or may be other power generation apparatus or a commercial power supply.

In this invention, when it is judged in the power supply voltage judgment step that the DC power supply voltage exceeds the judgment value, the phase of the PWM signal applied to the control terminals of the switch elements of the inverter circuit may be shifted until the DC power supply voltage is equal to or less than the judgment value.

With such a control performed, when the balance between the output of the inverter power generation apparatus and the output of the external AC power supply voltage collapses due to any cause, the state where the balance can be restored or the waveform, the crest value and the phase of the output voltage of the inverter power generation apparatus are coincident with those of the AC voltage applied from the external AC power supply can be restored. Thus, the state where the current flows from the side of the external AC power supply through the load connection terminals into the side of the inverter circuit can be avoided.

In this case, the external AC power supply may be the inverter power generation apparatus of the same construction or other power generation apparatus or the commercial power supply as well.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIG. 6 is a schematic diagram of a circuit illustrating the state where the two inverter power generation apparatuses of FIG. 1 are operated in parallel to each other and the balance between the outputs of both of the inverter power generation apparatuses collapses;

FIG. 13 is a timing chart illustrating the phase shift of the PWM signals performed in one embodiment of the invention.

DETAILED DESCRIPTION OF PREFERRED EMBODIMENTS

Now the embodiments of the invention will be described with reference to the drawings hereinafter.

Figure 1:
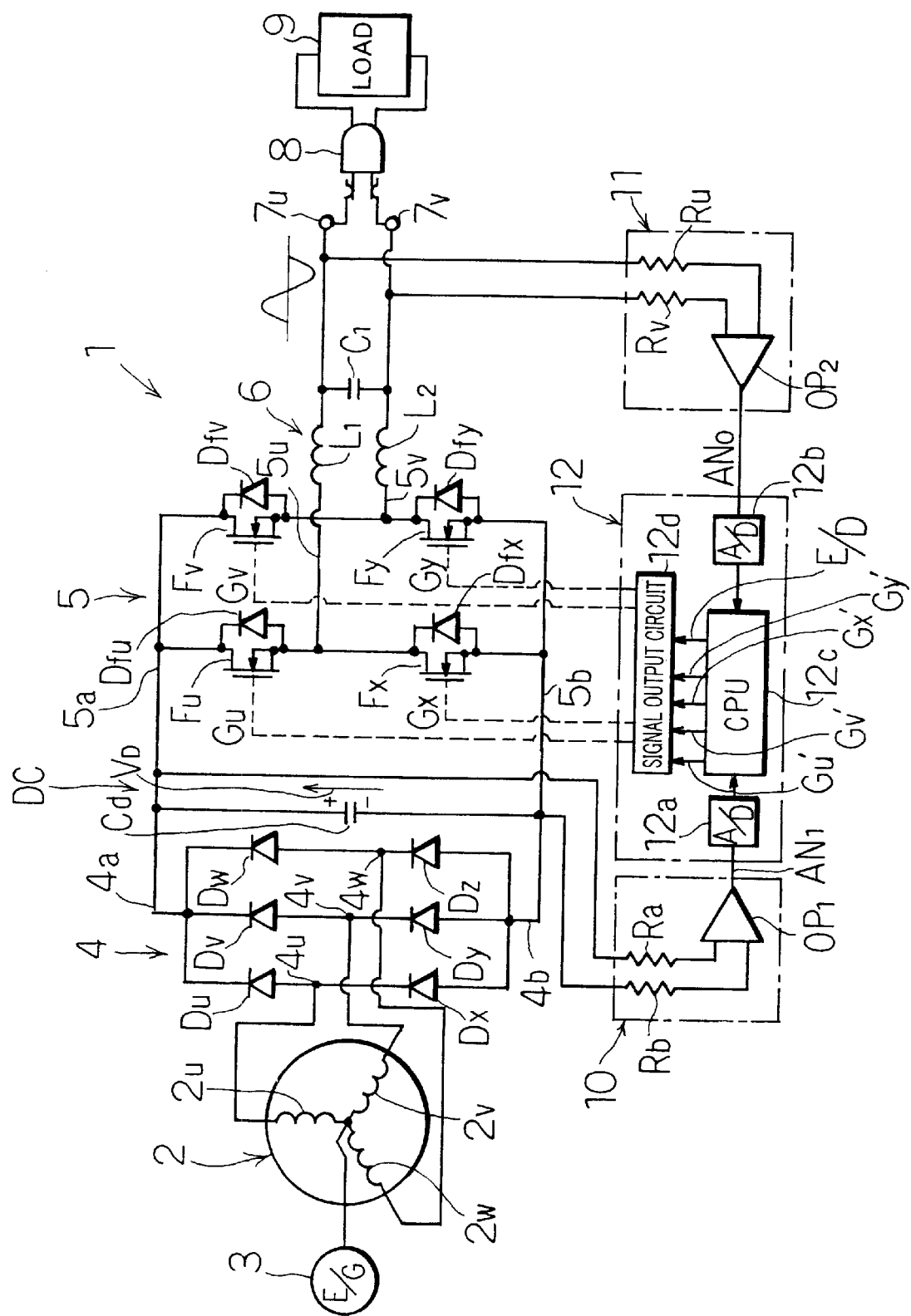
FIG. 1 is a schematic diagram of an inverter power generation apparatus to which the invention can be applied.

FIG. 1 shows an example of a construction of the inverter power generation apparatus to which the invention is applied. A three-phase magneto AC generator 2 driven by an internal combustion engine (E/G) 3 comprises a multi-pole magnet rotor not shown and a stator having generation coils 2u through 2w connected in three-phase. The rotor is provided on a crankshaft of an internal combustion engine (E/G) 2.

A control rectifier 4 comprises diodes Du through Dw and Dx through Dz connected in the form of three-phase bridge. Three-phase output terminals of the generator 2 are connected to three-phase AC input terminals 4u through 4w of the rectifier 4, respectively, while a smoothing capacitor Cd is connected across DC output terminals 4a and 4b of the rectifier 4. A DC power supply section DC is formed by the rectifier 4 and the smoothing capacitor Cd.

A bridge type inverter circuit (electric power converter circuit) 5 comprises a bridge circuit of a switch arm formed of a series circuit of MOSFETs Fu and Fx as switch elements and a switch arm formed of a series circuit of MOSFETs Fv and Fy as switch elements. Between the drain and the source of the MOSFETs Fu, Fv and Fx, Fy, there are connected feedback diodes Dfu, Dfv and Dfx, Dfy having anodes faced toward the sources of the FETs. In the illustrated embodiment, the feedback diodes may comprise an incidental diode formed between the drain and the source of the respective MOSFETs.

A pair of input terminals 5a and 5b of the inverter circuit 5 are led out of the common connection point of one of the ends of the switch arms and the common connection point of the other ends thereof and a pair of AC output terminals 5u and 5v are led out of the connection point of the MOSFETs (switch elements) of the two switch arms. The input terminals 5a and 5b are connected to the output terminals 4a and 4b of the rectifier 4 and the pair of output terminals 5u and 5v are connected to a pair of load connection terminals 7u and 7v through a low pass passage type filter circuit 6 which may be formed of inductances L1 and L2 and a capacitor C1. A load 9 is connected across the load connection terminals 7u and 7v through a conventional connector 8 formed of a socket and a plug.

A power supply voltage detection circuit 10 serves to detect a DC power supply voltage output from the DC power supply section 4 and may comprise an operational amplifier OP1 and resistors Ra and Rb. An output voltage detection circuit 11 serves to detect an AC output voltage output from the filter circuit 6 and may comprise an operational amplifier OP2 and resistors Ru and Rv.

An analogue output of the power supply voltage detection circuit 10 and an analogue output of the output voltage detection circuit 11 are input to a controller 12 to control the inverter circuit 5.

The controller 12 may comprise an A/D converter 12a to convert the output of the power supply voltage detection circuit 10 into a digital signal, an A/D converter 12b to convert the output of the output voltage detection circuit 11 into a digital signal, a microcomputer having a CPU 12c and not shown RAM, ROM and the likes and a signal output circuit 12d to apply PWM signals Gu, Gv, Gx and Gy to gates (control terminals) of the FETs Fu, Fv, Fx and Fy in accordance with drive command signals Gu', Gv', Gx' and Gy' output from the port of the CPU 12c.

In the inverter power generation apparatus 1 of FIG. 1, the AC voltage output generated by the AC generator 2 is converted into a DC power supply voltage VD by the DC power supply section DC comprising the rectifier 4 and the smoothing capacitor Cd and the DC power supply voltage VD is input to the inverter circuit 5.

The CPU 12c of the controller 12 reads data AN1 of the DC power supply voltage VD applied from the DC power supply section DC through the operational amplifier OP1 and the A/D converter 12a and reads instant data AN0 indicating the voltage across the load connection terminals 7u and 7v through the operational amplifier OP2 of the output voltage detection circuit 11 and the A/D converter 12b. The CPU 12c arithmetically operates the duty value "D" of the PWM cycle based on these data and applies the PWM signals to the control terminals of the switch elements of the inverter circuit 5 so that the output of the switch circuit is made intermittent by the obtained duty value "D". Thus, the AC voltage of intermittent waveform having the duty value changing for every PWM cycle in accordance with the instant value of the AC output voltage applied through the load connection terminals 7u and 7v to the load 9 is output from the inverter circuit 5.

FIGS. 2A, 2B, 2C and 2D show the PWM signals Gu, Gy, Gx and Gv applied to the gates of the FETs Fu, Fy, Fx and Fv from the controller 12 in case that the AC output voltage of sine waveform should be obtained from the load connection terminals. The FETs Fu, Fy, Fx and Fv are in the on-state when the PWM signals Gu, Gy, Gx and Gv are at high level while they are in the off-state when the PWM signals Gu, Gy, Gx and Gv are at low level.

FIGS. 2E and 2F show a timing at which the pairs of switch elements (Fu, Fy) and (Fx, Fv) located at the diagonal position of the bridge circuit get the on-state at the same time while FIGS. 2G and 2H show a timing at which the two upper arm switch elements (Fu, Fv) of the bridge circuit get the on-state at the same time and a timing at which the lower arm switch elements (Fx, Fy) of the bridge circuit get the on-state at the same time.

In case that the waveform of the AC output voltage to be output through the load connection terminals 7u and 7v should be the sine waveform, a positive half wave voltage of intermittent waveform (identical to that shown in FIG. 2E) having a duty value changing for every PWM cycle $\Delta t$ in proportion to the instant value of the AC voltage of sine waveform is output by producing a period of FIG. 2E where the pair of FETs Fu and Fy located at the diagonal position get the on-state at the same time by applying the PWM signals Gu and Gy of pulse waveform to the gates of the FETs Fu and Fy, respectively, during the period of the positive half wave of the AC output voltage.

Figure 2:
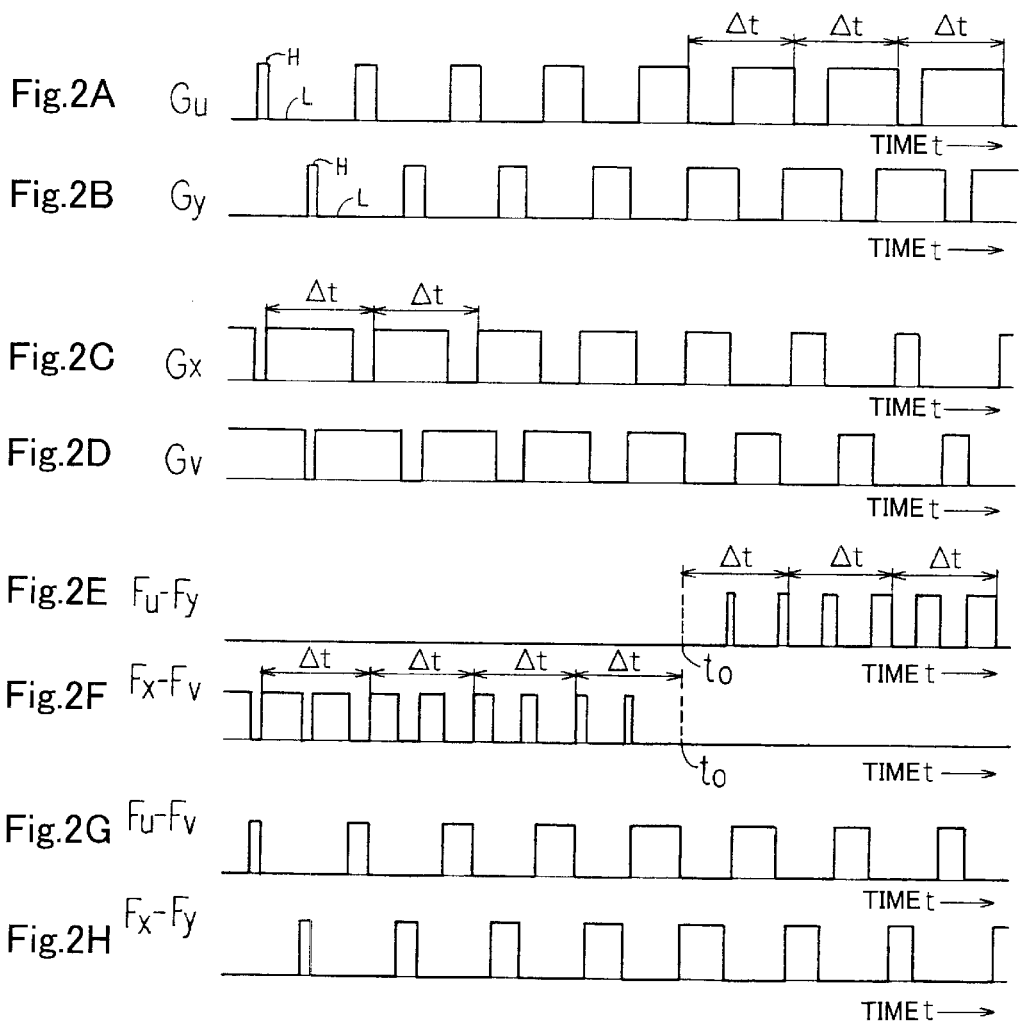
FIG. 2 is a time chart showing an operation of supplying PWM signals to switch elements of an inverter circuit used for the inverter power generation apparatus of FIG. 1 and an on-off control action of the switch elements.

A negative half wave voltage of intermittent waveform (identical to that shown in FIG. 2F) having a duty value changing for every PWM cycle $\Delta t$ in proportion to the instant value of the AC voltage of sine wave is output by producing a period of FIG. 2F where the pair of FETs Fx and Fv located at the diagonal position get the on-state at the same time by applying the PWM signals Gx and Gv of pulse waveform to the gates of the FETs Fx and Fv, respectively, during the period of the negative half wave of the AC output voltage. In FIG. 2 "t0" designates a cross zero point where the AC output voltage moves from the negative half wave to the positive half wave.

The AC voltage of intermittent waveform output from the inverter circuit 5 is applied to the load 9 across the load connection terminals 7u and 7v after it is converted into the smoothed AC output voltage of sine waveform through the filter circuit 6.

The PWM signals comprise a signal of pulse waveform generally having a first state (a Hi level state in the embodiment of FIG. 2) and a second state (a Lo level state in the embodiment of FIG. 2) alternately obtained. The switch elements of the inverter circuit 5 get the on-state during the period of the first state of the PWM signals while they get the off-state during the period of the second state thereof.

In the embodiment illustrated in FIG. 2, the PWM signals Gu and Gx are pulse signals having a phase reverse to each other and generated with the constant.PWM cycle $\Delta t$ while the PWM signals Gy and Gv are pulse signals having a reverse to each other and delayed for predetermined phase relative to the PWM signals Gu and Gx whereby the AC voltage of intermittent waveform having the duty value changing for every PWM cycle $\Delta t$ is output from the inverter circuit 5 by changing the duty value of each of the PWM signals for every PWM cycle $\Delta t$.

In the inverter power generation apparatus of FIG. 1, as shown in FIGS. 2G and 2H, the switching pattern of the FETs of the inverter circuit 5 is so determined that there happen the period during which the upper arm FETs Fu and Fv of the bridge of the inverter circuit 5 get the on-state at the same time and the period during which the lower arm FETs Fx and Fy of the bridge get the on-state at the same time. With the switching pattern so determined, since the capacitor C1 of the filter circuit 6 can be discharged during the simultaneous on-state of the upper arm FETs Fu and Fv and during the simultaneous on-state of the lower arm FETs Fx and Fy, there can be obtained the AC output voltage of smoother waveform across the load connection terminals 7u and 7v.

In the description, what is meant by the duty value "D" of the PWM control is a ratio of the period during which the output voltage or output current of the inverter circuit is at Hi level or the switch elements at the diagonal position of the inverter circuit 5 are in the on-state at the same time relative to every PWM cycle $\Delta t$.

In case that the controller 12 is formed by using the microcomputer, every PWM cycle can be detected by counting the pulses generated with constant period within the microcomputer by a PWM cycle counter and the time when every PWM cycle starts is set as the switching timing.

The microcomputer 12c processes an internal interruption for every PWM cycle Δt to each of the FETs Fu, Fx, Fv and Fy, sets the on-time of the switch elements at the PWM signal generating timers based on the duty value determined by reading it from a map in the internal interruption process and gets the first state (the Hi level state, for instance) of the potential at the drive command signal output port of the CPU 12c so that the drive command signals Gu', Gv', Gx' and Gy' of pulse waveform are generated from the output port. The PWM signal output circuit 12d applies the PWM signals Gu, Gv, Gx and Gy to the gates of the FETs Fu, Fv, Fx and Fy (the control terminals of the switch elements), respectively when the CPU generates the drive command signals Gu', Gv', Gx' and Gy', respectively to perform the on-off control of the FETs.

Figure 3:
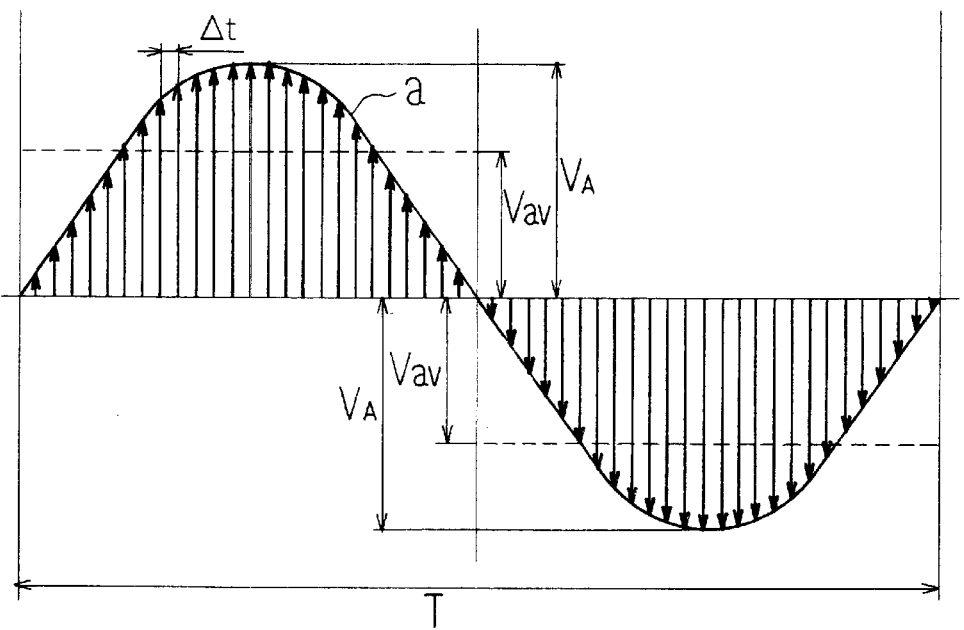
FIG. 3 illustrates a waveform of AC voltage obtained across the load connection terminals of the inverter power generation apparatus of FIG. 1 and an internal interruption timing in the PWM control.

FIG. 3 shows a relationship of the internal interruption timing (the switching timing of the switch elements of the inverter circuit) with the duty value of the PWM signals. In this figure, a reference "a" designates the waveform of the AC voltage obtained across the load connection terminals 7u and 7v, "Δt" designates the PWM cycle, "VA" designates the rated value of the crest value of the AC voltage "a", "Vav" designates an average value of the AC voltage "a" and "T" designates a cycle of the AC voltage to be obtained.

The inverter circuit 5 outputs the AC voltage of intermittent waveform having the duty value "D" changing for every PWM cycle Δt in accordance with the instant value of the AC output voltage "a" obtained across the load connection terminals. The waveform of the AC voltage is so set that the sine wave AC voltage of one cycle is divided into n pieces so that the waveform of the AC voltage has the stepped waveform. There can be obtained across the load connection terminals 7u and 7v the sine wave output voltage of smoother waveform by passing the stepped waveform of the AC voltage through the filter circuit 6.

Supposed that the output voltage of the inverter power generation apparatus is the sine wave AC voltage, the reference duty value "Do" of the output of the inverter will be given as follows;

$$Do = \mathrm{Sin}(2\pi n \Delta t / T) \tag{1}$$

wherein "n" designates a numerical value indicating in what order the PWM cycle is from the zero cross point at the rising up of the waveform of the AC voltage and given by the counted value of the counter provided in the controller for counting the PWM cycle.

In the PWM control performed by the controller 12, the duty value "D" can be determined by multiplying the reference duty value "Do" given by the aforementioned formula (1) by a predetermined correction coefficient "Kv" changing with variation in the DC power supply voltage "VD".

Figure 5:
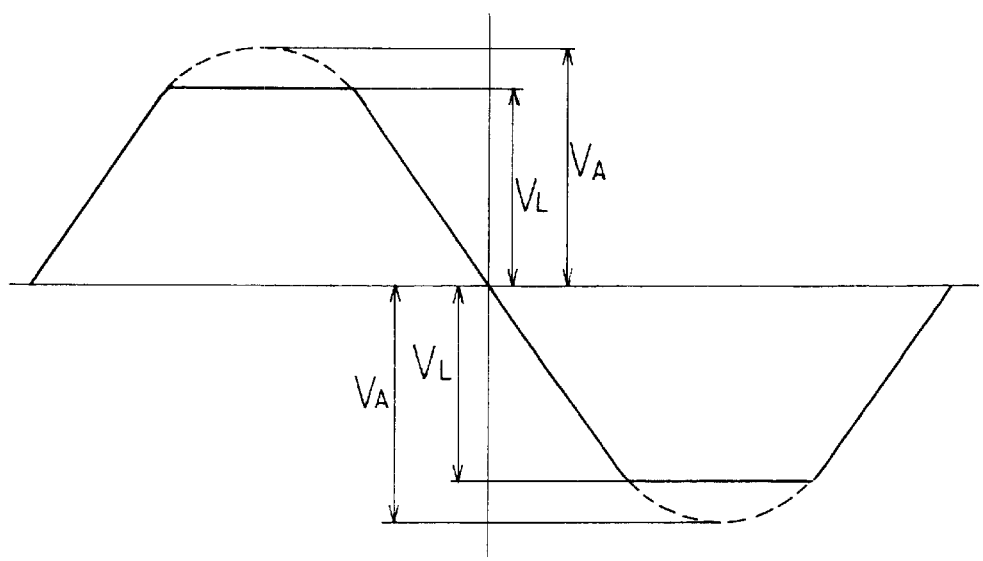
FIG. 5 illustrates a waveform of the output voltage when the load current exceeds the maximum rated load current in the inverter power generation apparatus of FIG. 1.
Figure 4A:
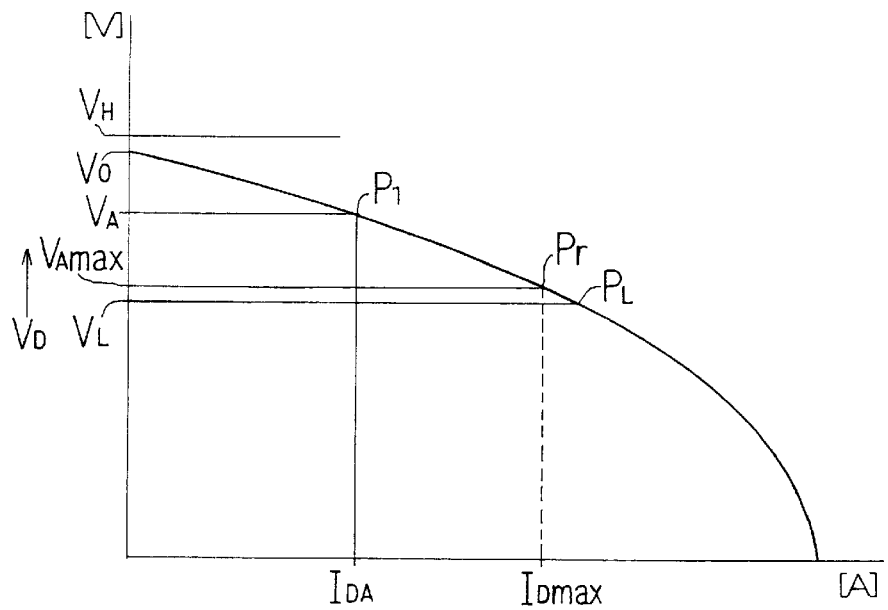
FIGS. 4A and 4B illustrate curves of the output characteristics of the DC power supply section of the inverter power generation apparatus of FIG. 1.

The DC power supply voltage "VD" changes relative to the output current "ID" as indicated by a curve of FIG. 4A, for instance. Supposed that the maximum rated value of the crest value of the AC output voltage obtained across the load connection terminals 7u and 7v is "VAmax", the operation point at that time is at the position "Pr" of FIG. 4A and the maximum rated load current gets the value indicated by "IDmax". The maximum rated load current "IDmax" is the maximum load current allowable for obtaining the AC voltage having no waveform distortion across the load connection terminals. As the load current exceeding the maximum rated load current "IDmax" flows, the waveform of the AC output voltage has the distortion waveform in which the peak portion of the waveform is crushed as shown in FIG. 5.

Supposed that the rated value of the crest value of the AC output voltage output from the inverter power generation apparatus is "VA" (>VAmax), the operation point at that time is at the position "P1" of FIG. 4A and the maximum rated load current gets the value indicated by "IDA". In case that the DC power supply voltage "VD" varies as indicated in FIG. 4A, the correction coefficient "KV" by which the reference duty value "Do" should be multiplied for obtaining the rated value of the crest value of the AC output voltage will be given as follows;

$$Kv = VA/VD \tag{2}$$

Thus, the duty value "D" of the PWM control in case that the rated value of the crest value of the AC output voltage is "VA" will be given as follows;

$$D = \mathrm{Sin}(2\pi n \, \Delta t/T) \times (VA/VD) \tag{3}$$

In the inverter power generation apparatus of FIG. 1, the data "AN0" indicating the instant value of the AC voltage across the load connection terminals 7u and 7v is read in the CPU 12c and the duty value "D" is corrected so that when the data "AN0" is lower than the data indicating the rated value, the duty value "D" for the PWM control is made larger and when the data. "AN0" is larger than the data indicating the instant value of the AC voltage across the load connection terminals 7u and 7v, the duty value "D" for the PWM control is made smaller whereby a deviation between the rated value and the output voltage detected by the output voltage detection circuit 11 is so controlled as to get closer to zero.

The duty value "D'" obtained after this correction is made will be given as follows;

$$D' = D + G \times (ANS - AN0) \times Kc \tag{4}$$

wherein "ANS" designates the rated value of each of the instant values of the AC output voltage and "G" designates a gain to determine the ratio of correction amount relative to a deviation between the rated value "ANS" and the value "AN0". The gain is usually set at the value equal to or less than 1. The coefficient "Kc" is one by which the correction value [G×(ANS−AN0)] of the instant value of the voltage across the load connection terminals should be multiplied for converting the correction value into the one having the duty value for that time and the coefficient "Kc" is a numerical value determined by "Kv".

The CPU 12c determines the duty value "D" by the formula (3) while using the reference duty value "Do" read from the ROM in accordance with the count value "n" of the PWM cycle counter whenever the PWM cycle is detected by the counter and the correction coefficient Kv obtained by the arithmetical operation on the formula (2) using the read data "AN1 (=VD) of the DC power supply voltage or otherwise determines the duty value "D" by reading it from the map for arithmetically operating the duty value previously stored in the ROM. The map for arithmetically operating the duty value used herein is a three-dimensional map providing a relation of the count value "n" of the counter, the data "AN1" of the output voltage of the rectifier and the duty value "D".

In case that the deviation between the voltage across the load connection terminals 7u and 7v and the rated value is controlled to be made zero, the PWM signals are applied to the FETs of the inverter circuit so that the output of the inverter circuit is controlled in the form of PWM with the duty value "D'" corrected so as to have no deviation between the data "AN0" of the output voltage and the rated value using the formula (4).

Also, in the inverter power generation apparatus of FIG. 1, when the DC power supply voltage VD gets lower than a value of an overcurrent judgment voltage whereby it is detected that the overcurrent exceeding the set value flows through the load connection terminals 7u and 7v, the port of the CPU 12c gets the off-state or the Enable/Disable signal has the state of Disable so that the PWM signal stops being supplied to the switch elements of the inverter circuit so as to interrupt the overcurrent.

Instead of detecting from the magnitude of the DC power supply voltage VD that the overcurrent flows, there may be provided a current detector which detects the load current flowing through the inverter circuit 5 and when it is detected from the output of the current detector that the overcurrent exceeding the value of the overload judgment current flows, the PWM signal may stop being supplied to the switch elements of the inverter circuit so as to interrupt the overcurrent.

In the inverter power generation apparatus of FIG. 1, the controller 12 serves to control the inverter circuit so that the waveform, the crest value and the phase of the AC output voltage applied from the inverter circuit across the load connection terminals are coincident with those of the external AC voltage, respectively for preparing for the parallel operation.

It will be considered that the two inverter power generation. apparatuses 1A and 1B as shown in FIG. 6 may be provided so as to be operated in parallel to each other as illustrated in FIG. 6. In the embodiment of FIG. 6, current detectors 13 may be provided on lines connecting the filter circuits 6 to the load connection terminal 7v, respectively, so that the outputs of the current detectors 13 are input to the corresponding controllers 12, respectively whereby it is detected that the overcurrent flows through the inverter circuits.

In the state where the two inverter power generation apparatuses 1A and 1B are operated in parallel to each other as shown in FIG. 6, the controllers 12 perform the control to make the waveforms, the crest values and the phases of the two inverter power generation apparatuses coincident with each other.

Figure 4B:
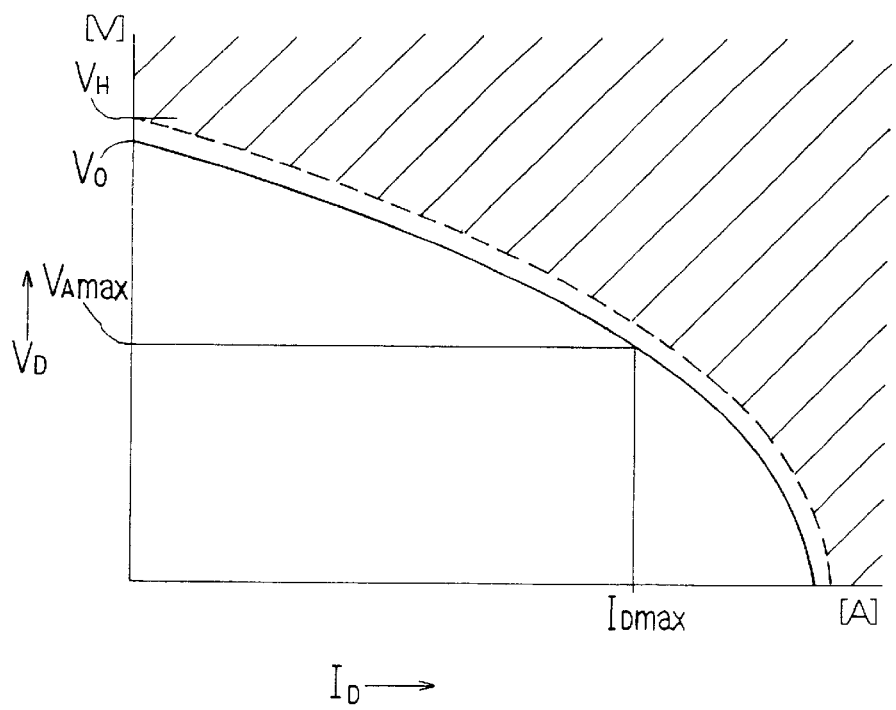

In spite of such a control performed, as a gap arises between the timings of the PWM control (the timings when each PWM cycle Δt starts) of the inverter power generation apparatuses due to the shift of the clock pulses of the controllers in the respective inverter power generation apparatuses, the balance between the outputs of the inverter circuits will sometimes collapse. If it is supposed that the output voltage of the inverter power generation apparatus 1B momentarily gets larger than that of the inverter power generation 1A because of the collapse of the balance between the two inverter power generation apparatuses, a part ILB1 of the load current ILB output from the inverter power generation apparatus 1B flows toward the load 9, but the remaining part ILB2 flows toward the DC power supply section DC of the inverter power generation apparatus 1A through the rectifier circuit of feedback diodes in the inverter circuit thereof as shown with an outline-type arrow in FIG. 6. As the current ILB2 flows from the inverter power generation apparatus 1B toward the inverter power generation apparatus 1A in this manner, the smoothing capacitor Cd is charged by the current ILB2 so that the DC power supply voltage VD increases and the duty value "D" of the PWM control gets smaller. In this state, the operation point of the AC generator falls within the range indicated by the shadow portion of FIG. 4B and the voltage VD (DC power supply voltage) across the capacitor Cd finally reaches the voltage VH higher than the no-load voltage Vo (crest value) of the AC generator 3. Thus, the inverter circuit 5 of the inverter power generation apparatus 1A cannot supply the current to the load 9 and the object of the parallel operation of the two inverter power generation apparatus cannot be accomplished.

In the invention, in view of the DC power supply voltage VD of the inverter power generation apparatus toward which the current flows from the load connection terminals reaching the voltage VH further higher than the no-load output voltage Vo of the DC power supply section (the crest value of the no-load output voltage of the generator), it is judged that the balance between the outputs of the two inverter power generation apparatuses collapses when it is detected that the DC power supply voltage VD exceeds the judgment value VH set at a value equal to or more than the no-load output voltage Vo of the DC power supply section.

As aforementioned, the process where it is judged whether the detected DC power supply voltage VD of each of the inverter power generation apparatuses is equal to or less than the judgment value VH set at the value equal to or more than the no-load output voltage Vo of the DC power supply section can be used as the power supply voltage judgment process or step and by performing the process at any time, it is judged at any time whether the balance between the outputs of the inverter power generation apparatuses 1A and 1B operated in parallel to each other is maintained or not.

The value of the DC power supply voltage when the maximum rated load current IDmax allowed for outputting the AC voltage having no waveform distortion from the respective inverter power generation apparatuses 1A and 1B through the load connection terminals 7u and 7v flows through the inverter circuit 5 of each of the inverter power generation apparatuses toward the load 9 is determined as the value of the minimum power supply voltage (VAmax of FIG. 4A) in the steady state. When it is judged in the power supply voltage judgment step that both of the DC power supply voltages VD of the two inverter power generation apparatuses 1A and 1B are equal to or less than the judgment value VH, the value of the overload judgment voltage for the overload protection control of each of the inverter power generation apparatuses is set at a value equal to the value of the minimum power supply voltage in the steady state whereby the load current is prohibited from exceeding the maximum rated load current ID max.

When it is judged in the power supply voltage judgment step that the DC power supply voltage VD of one of the two inverter power generation apparatuses 1A and 1B (the inverter power generation apparatus 1A, for example) exceeds the judgment value VH, the value of the overload judgment voltage for the overload protection control of the inverter power generation apparatus 1B is set at the value further lower than the value of the minimum power supply voltage in the steady state whereby the other inverter power generation apparatus 1B is allowed to be operated in the overload state.

With the inverter power generation apparatus 11B controlled so that the load current thereof is allowed to exceed the maximum rated load current when it is judged that the DC power supply voltage VD of the inverter power generation apparatus 1A exceeds the judgment value VH, the output voltage of the inverter power generation apparatus 1B is lowered due to the overload current. Thus, the current never flows from the inverter power generation apparatus 1B to the inverter power generation apparatus 1A and therefore the DC power supply voltage VD of the inverter power generation apparatus 1A is lowered. Thus, as shown in FIG. 7, the load current ILA flows from the inverter power generation apparatus 1A as well so that the parallel operation can be restored.

Figure 7:
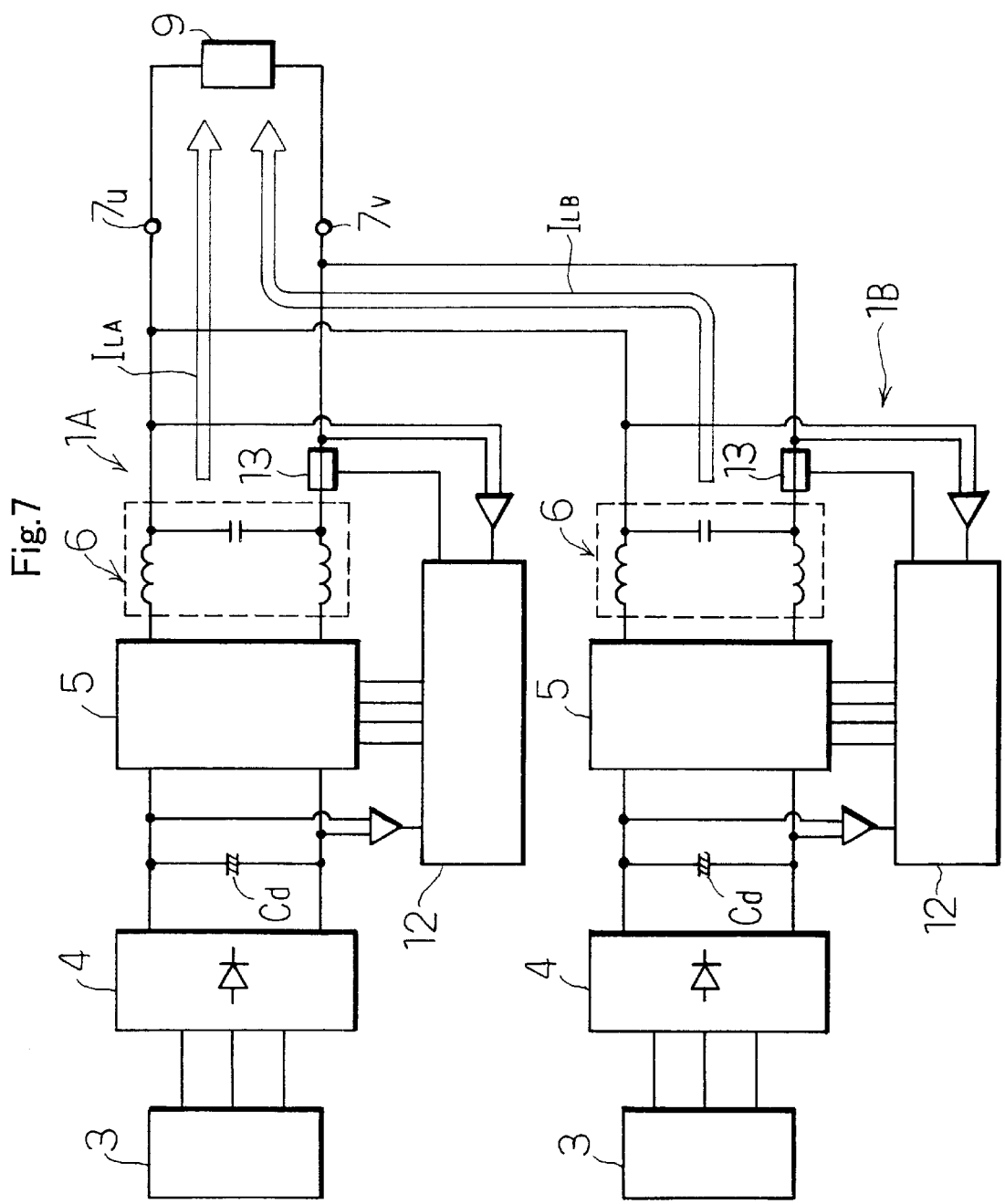
FIG. 7 is a schematic diagram of a circuit illustrating the state where the two inverter power generation apparatuses of FIG. 1 are operated in parallel to each other and the balance between the outputs of both of the inverter power generation apparatuses is maintained.

In the state where the two inverter power generation apparatuses 1A and 1B are operated in parallel to each other as shown in FIG. 7, when both of the load currents of the two inverter power generation apparatuses gets excessive, the PWM signals stop being supplied to the inverter circuits of both of the inverter power generation apparatuses so that the outputs of them are stopped whereby the overcurrent is prevented from flowing through the load 9.

In case that the load current detector 13 is provided in each of the inverter power generation apparatuses as shown in FIGS. 6 and 7, when it is detected that the load current detected by the load current detector 13 exceeds the value of the overload judgment current, the outputs of the inverter circuits may be stopped whereby the overload protection is performed.

In case that the overload protection control is performed for the inverter power generation apparatus the invention is applied to, when it is judged in the power supply voltage judgment step that the DC power supply voltages VD of the two inverter power generation apparatuses are equal to or less than the judgment value equal to or more than the no-load output voltage Vo of the corresponding DC power supply section DC, the value of the overload judgment current of each of the inverter power generation apparatuses is set at the value equal to the value of the maximum rated load current IDmax allowed for outputting the AC output voltage having no waveform distortion from each of the inverter power generation apparatuses whereby the load current of each of them is prohibited from exceeding the maximum rated load current IDmax and when it is judged in the power supply voltage judgment step that the DC power supply voltage VD of one of the two inverter power generation apparatuses 1A and 1B (the inverter power generation apparatus 1A, for example) exceeds the judgment value VH, the value of the overload judgment current of the inverter power generation apparatus 1B is set at the value larger than the value of the maximum rated load current whereby the other inverter power generation apparatus 1B allowed to be operated in the overload state where the load current of the other inverter power generation apparatus 1B exceeds the maximum rated load current.

In the inverter power generation apparatus shown in FIG. 1, there is used the duty value "D" obtained by multiplying by the correction coefficient Kv the reference duty value "Do" required for obtaining the predetermined waveform of the AC output voltage output from the load connection terminals and the controller 12 may be so constructed that when the external AC voltage is applied across the load connection terminals from the external AC power supply, the waveform, the crest value and the phase of the AC output voltage applied from the inverter circuit 5 across the load connection terminals 7u and 7v are coincident with those of the external AC voltage.

Figure 8:
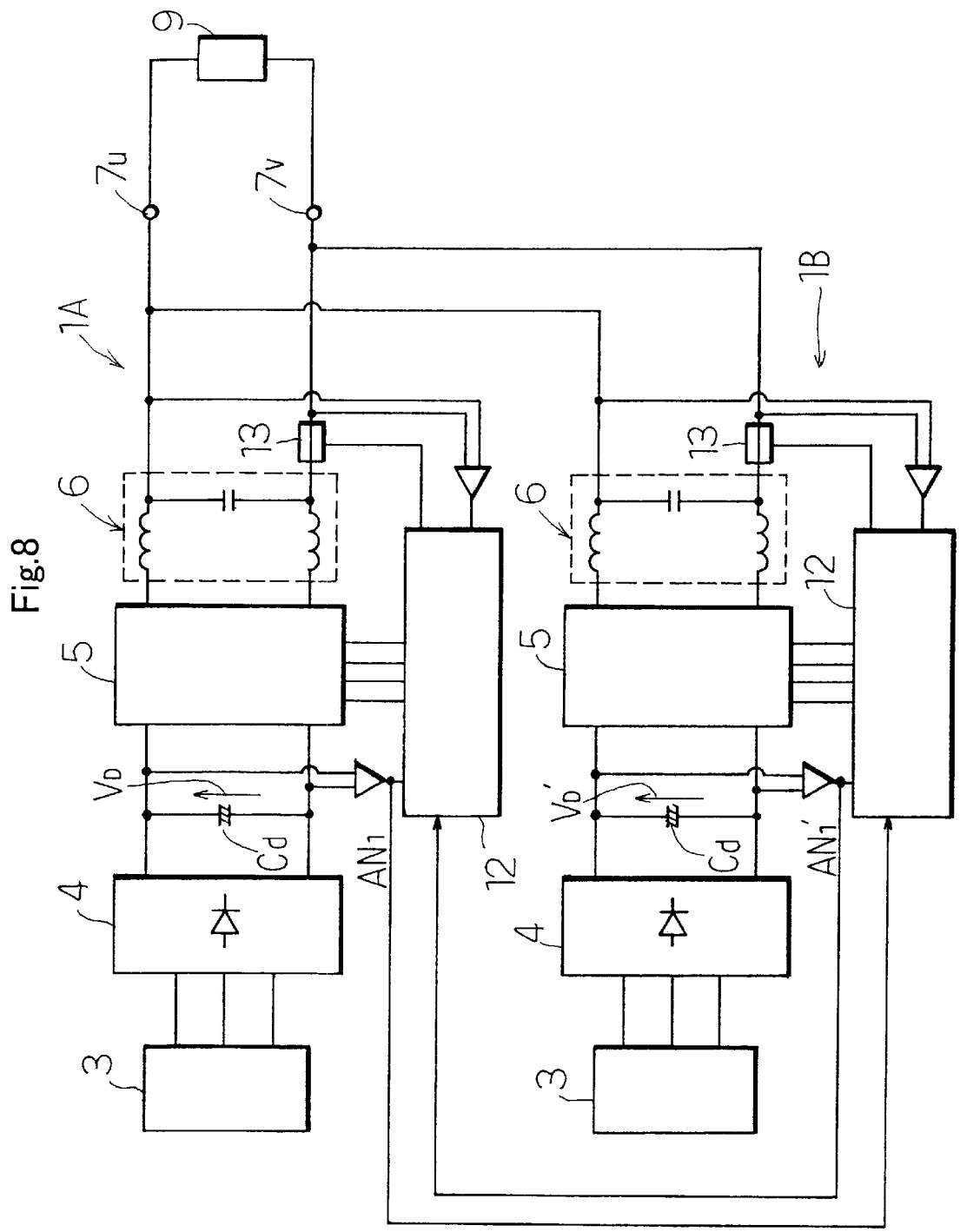
FIG. 8 is a schematic diagram of a circuit illustrating the apparatuses by which the unbalance between the outputs is avoided by applying the data of the output of the DC power supply section of each of the inverter power generation apparatuses to the controller of the other inverter power generation apparatus in the control method of the invention when the two inverter power generation apparatuses are operated in parallel to each other.

In case that the invention is applied to the inverter power generation apparatus having the controller constructed as aforementioned, there may be used the AC generators 3 having the same characteristics for the two inverter power generation apparatuses 1A and 1B. For instance, as shown in FIG. 8, the data AN1' (=VD') of the DC power supply voltage detected by the power supply voltage detection circuit of the inverter power generation apparatus 1B is applied to the controller 12 of the inverter power generation apparatus 1A while the data AN1 (=VD) of the DC power supply voltage detected by the power supply voltage detection circuit of the inverter power generation apparatus 1A is applied to the controller 12 of the inverter power generation apparatus 1B. The power supply voltage judgment process is performed in which whether the detected DC power supply voltages VD and VD' of the inverter power generation apparatuses 1A and 1B are equal to or less than the judgment value VH set at the value equal to or more than the no-load output voltage Vo of the DC power supply section of the corresponding inverter power generation apparatuses is judged. When the it is judged in the power supply judgment process that both of the DC power supply voltages VD and VD' of the two inverter power generation apparatuses 1A and 1B are equal to or less than the judgment value, the ratios VA/VD and VA/VD' of the rated value VA of the crest value of the AC voltage output through the load connection terminals 7u and 7v relative to the DC power supply voltages VD and VD' are used as the correction coefficient Kv for the PWM control of the inverter power generation apparatuses 1A and 1B.

When it is judged in the power supply voltage judgment process that the DC power supply voltage VD of the inverter power generation apparatus 1A, for example exceeds the judgment value VH, the ratio VA/VD' of the rated value VA of the crest value of the AC voltage across the load connection terminals 7u and 7v relative to the DC power supply voltage VD' is used as the correction coefficient Kv for the PWM control of the inverter power generation apparatus 1A.

In this manner, with the ratio VA/VD' of the rated value VA of the crest value of the AC voltage applied through the load connection terminals across the load 9 relative to the DC power supply voltage VD' of the other inverter power generation apparatus 1B used for the coefficient Kv for determining the duty value of the PWM control of the inverter power generation apparatus 1A when it is judged that the DC power supply voltage VD of the inverter power generation apparatus 1A exceeds the judgment value VH or when the load current of the other inverter power generation apparatus 1B flows into the inverter power generation apparatus 1A, since the ratio VA/VD' can be used for the correction coefficient Kv for determining the duty value "D" of the PWM control of the two inverter power generation apparatuses 1A and 1B, so that the duty values of the PWM control of the them can be equal to each other, the unbalance between the outputs of the two inverter power generation apparatuses 1A and 1B can be cancelled whereby the current is prevented from flowing from one of the inverter power generation apparatus to the other inverter power generation apparatus.

Similarly, when it is judged in the power supply voltage judgment process that the DC power supply voltage VD' of the inverter power generation apparatus 1B exceeds the judgment value VH set at the value equal to or more than the crest value Vo of the no-load output voltage of the DC power supply section, the ratio VA/VD of the rated value VA of the crest value of the AC voltage across the load connection terminals 7u and 7v relative to the DC power supply voltage VD of the inverter power generation apparatus 1A is used as the correction coefficient Kv for the PWM control of the inverter power generation apparatus 1B.

Figure 9:
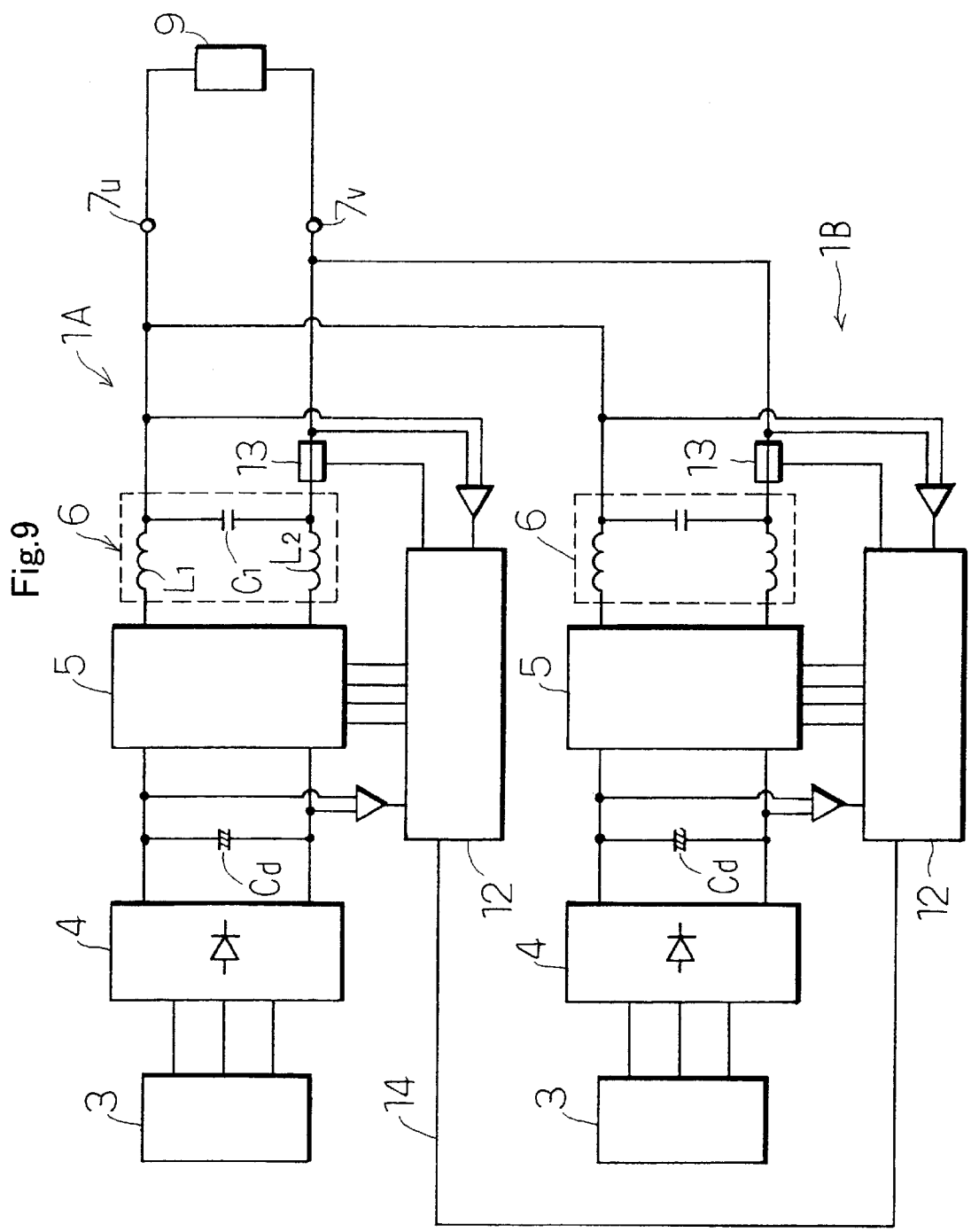
FIG. 9 is a schematic diagram of a circuit illustrating the apparatus by which the timing of the PWM control of the two inverter power generation apparatuses is synchronized in the control method of the invention when the two inverter power generation apparatuses are operated in parallel to each other.

In the invention, the controllers 12 of the inverter power generation apparatuses 1A and 1B may be connected by a signal line 14 as shown in FIG. 9 so that the timing signal for determining the start timing of every PWM cycle of the PWM control performed for one of the two inverter power generation apparatuses 1A and 1B is supplied through the signal line 14 to the other inverter power generation apparatus whereby the start timing of every PWM cycle of the PWM control performed for the other inverter power generation apparatus may be determined by the timing signal applied from the one inverter power generation apparatus. With the controllers 12 constructed as aforementioned, since the PWM control for the two inverter power generation apparatuses can be always performed while they are synchronized, the timing of the PWM control of the two inverter power generation apparatuses can be prevented from being shifted so that the outputs of them can be always balanced. Thus, the state where the current flows from the one inverter power generation apparatus into the other inverter power generation apparatus due to the collapse of the balance between the outputs of the two inverter power generation apparatuses can be prevented and the parallel operation of the two inverter power generation apparatuses can be performed without any trouble.

In case that this control is done, the overload state may be judged for the overload protection control either by detecting the output voltage of the DC power supply section or by detecting the load current.

In the invention, when it is judged in the power supply voltage judgment process that the DC power supply voltage VD of the inverter power generation apparatus 1A is equal to or less than the judgment value VH set at the value equal to or more than the no-load output voltage of the DC power supply section, the ratio VA/VD of the rated value VA of the crest value of the AC voltage output through the load connection terminals 7u and 7v relative to the DC power supply voltage VD of the inverter power generation apparatus 1A may be used as the correction coefficient Kv and when it is judged in the power supply voltage judgment process that the DC power supply voltage VD of the inverter power generation apparatus 1A exceeds the judgment value VH, the ratio VA/VDo of the rated value VA of the crest value relative to the provisional DC power supply voltage VDo set at a value equal to or less than the no-load voltage Vo of the AC generator may be used as the correction coefficient Kv.

Figure 10:
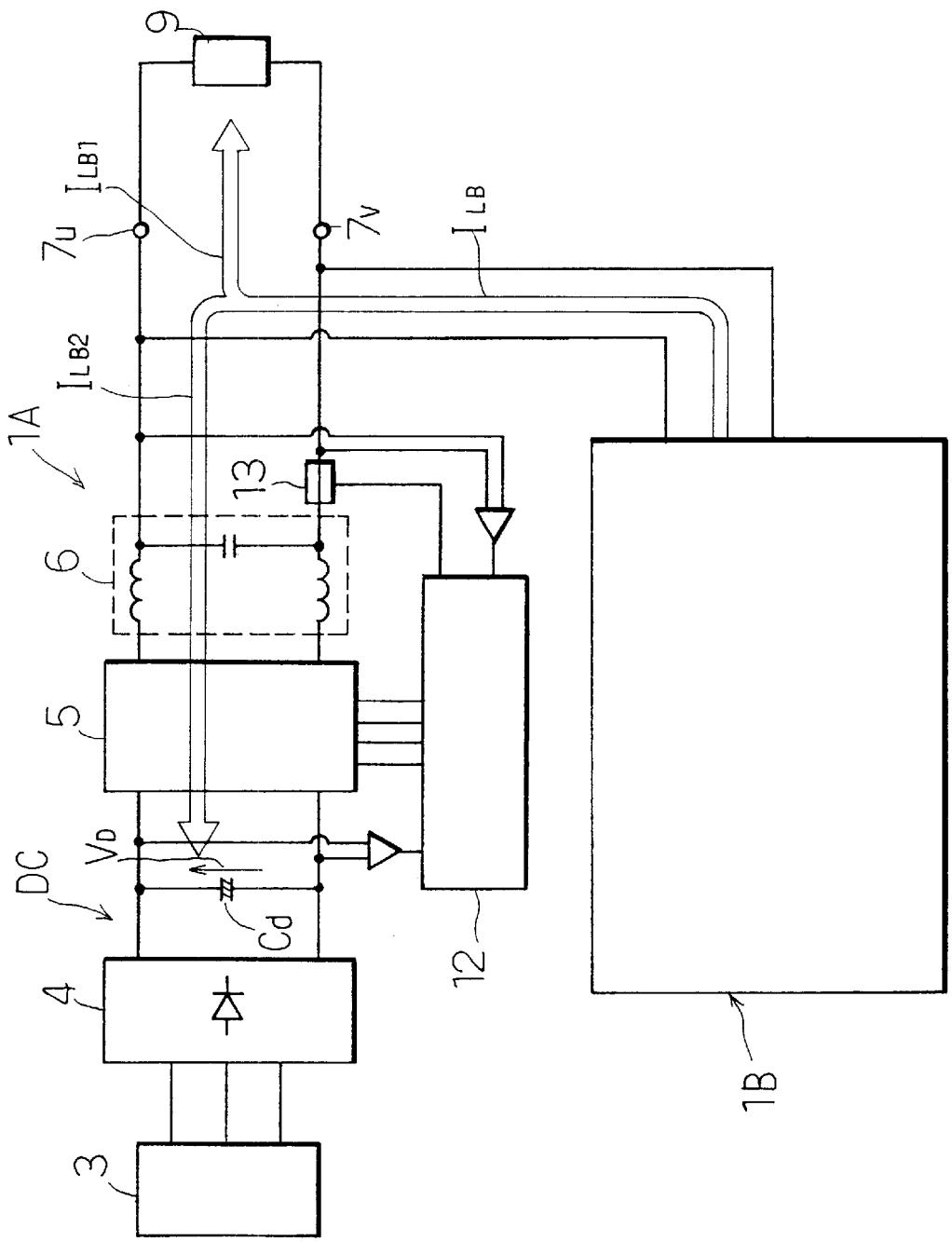
FIG. 10 is a schematic diagram of a circuit illustrating the state where the unbalance between the outputs of both of the two inverter power generation apparatuses arises when the two inverter power generation apparatuses are operated in parallel to each other.
Figure 11:
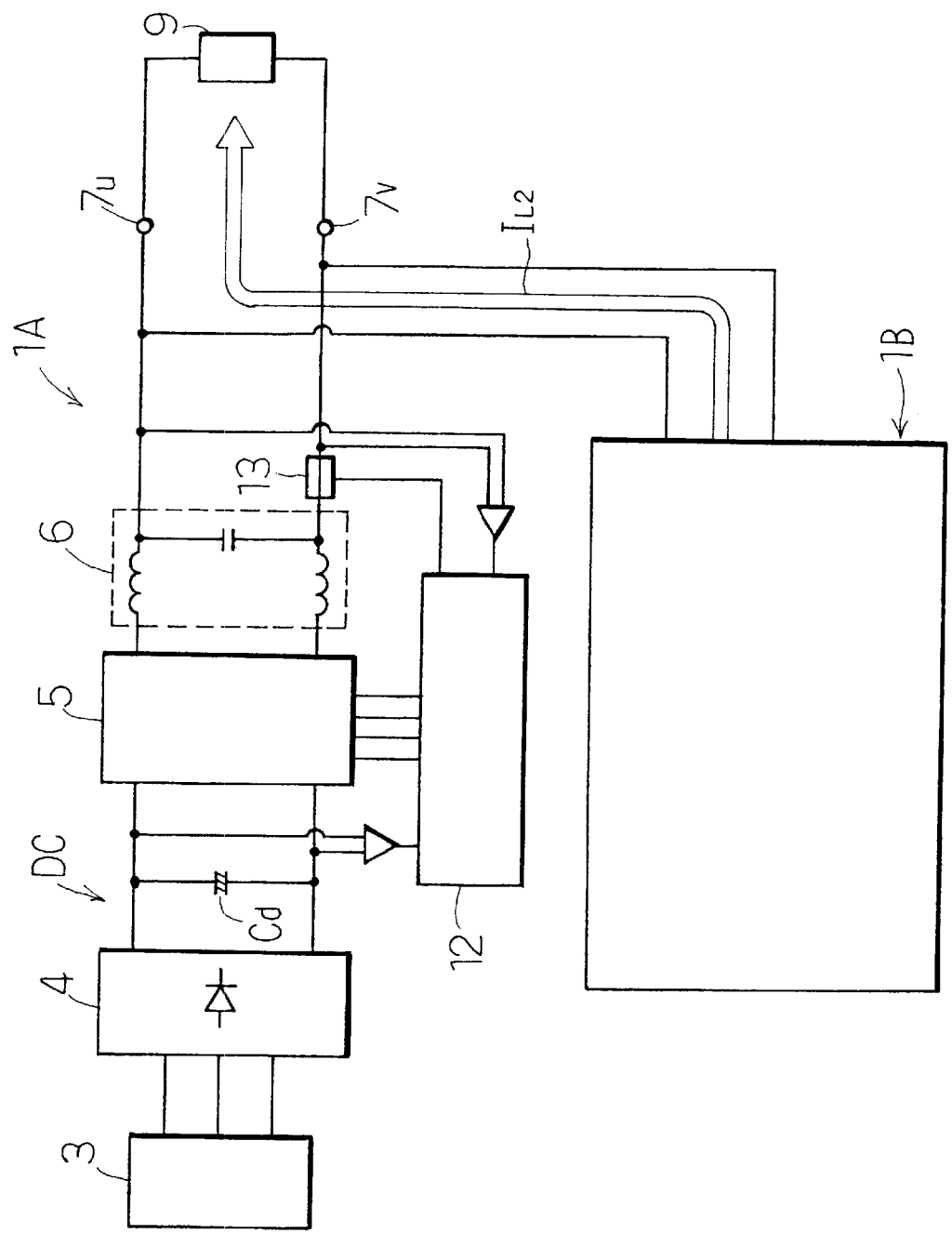
FIG. 11 is a schematic diagram of a circuit illustrating the state where the current flows from the external AC power supply into the inverter power generation apparatus avoided when they are operated in parallel to each other.

With the ratio VA/VDo of the rated value VA of the crest value relative to the AC output voltage of the inverter power generation apparatus 1A to the provisional DC power supply voltage VDo set at the value equal to or less than the no-load voltage Vo of the AC generator 3 used as the correction coefficient Kv for arithmetically operating the duty value "D" of the PWM control when the DC power supply voltage VD of the inverter power generation apparatus 1A exceeds the judgment value in the state where the current flows from the inverter power generation apparatus 1B into the inverter power generation apparatus 1A because the balance between the outputs of the two inverter power generation apparatuses operated in parallel to each other as shown in FIG. 10 collapses due to any cause, the state where the current flows into the inverter power generation apparatus 1A in a reverse direction can be deleted by making zero the current flowing, into the inverter power generation apparatus 1A or by making some load current flow out of the inverter power generation apparatus 1A as shown in FIG. 11. At that time, since the load current of the inverter power generation apparatus 1B operated in parallel to the inverter power generation apparatus 1A is fully consumed by the load, the load current of the inverter power generation apparatus 1B increases and the AC output voltage thereof is lowered. As the AC output of the inverter power generation apparatus 1B is lowered, the DC power supply voltage VD of the inverter power generation apparatus 1A is lowered and therefore the output voltage of the inverter power generation apparatus 1A increases. Thus, the normal state where the current is supplied from both of the inverter power generation apparatuses 1A and 1B is restored as shown in FIG. 12.

Figure 12:
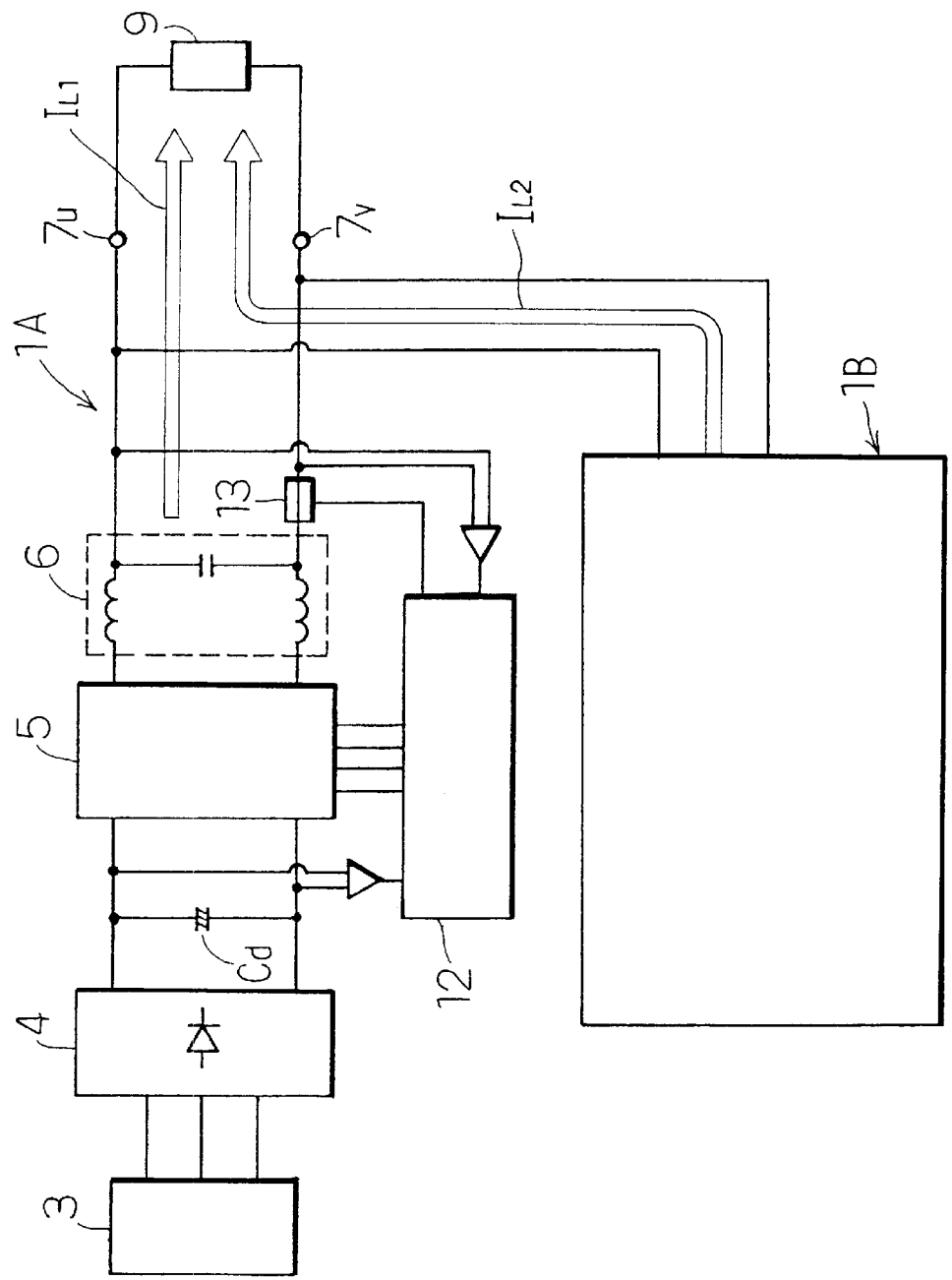
FIG. 12 is a schematic diagram of a circuit illustrating the state where the unbalance between the outputs of both of the inverter power generation apparatus and the external AC power supply avoided when they are operated in parallel to each other.

In the embodiment of FIGS. 10 through 12, the inverter power generation apparatus 1A individually performs the control of canceling the unbalance between the outputs of the inverter power generation apparatuses 1A and 1B. Accordingly, the inverter power generation apparatus 1B will be considered to be the external power supply as viewed from the inverter power generation apparatus 1A. The external power supply may be a power generation apparatus having the construction different from that of the inverter power generation apparatus 1A or the commercial power supply.

In this invention, when it is judged in the power supply voltage judgment step that the DC power supply voltage VD exceeds the judgment value, the phase of the PWM signal applied to the control terminal of the switch elements of the inverter circuit may be shifted until the output of the inverter power generation apparatus and the output of the external power supply operated in parallel to the inverter power generation apparatus are balanced whereby the DC power supply voltage VD may be adjusted to get equal to or less than the no-load voltage of the AC generator 3.

In order to shift the phase of the PWM signals, an amount δt of shift for which the phase is shifted once is set at a value shorter than the PWM cycle Δt (δt<Δt) and a series of PWM signals G1, G2 - - - are delayed for δt every one cycle of the AC output voltage as shown in FIGS. 13A through 13E or advanced for δt every one cycle as shown in FIGS. 13F through 13I.

FIGS. 13B through 13E show the phases of the PWM signals G1, G2 - - - delayed for δt, 2δt, nδt and (Δt/δt)×δt relative to the signal of FIG. 13A, respectively while FIGS. 13F through 13I show the phases of the PWM signals G1, G2 - - - advanced for δt, 2δt, nδt and (Δt/δt)×δt relative to the signal of FIG. 13A, respectively.

As the PWM cycle is too shifted, the difference of phase between the output of the inverter power generation apparatus and the output of the other power supply operated in parallel to the former is too large and therefore the unbalance between them are further larger. Thus, the amount δt of shift of the PWM cycle may be preferably within ±one PWM cycle (Δt).

In case that the output of the inverter power generation apparatus and the output of the external power supply are balanced by shifting the phase of the PWM signals, with the data of the DC power supply voltage when the phase of the PWM signals are shifted for δt, 2δt, - - - , nδt supposed to be AN1(1), AN1(2), AN1(n) - - - , respectively, for instance, a series of values of AN1 when the phase of the PWM signals is shifted from 0 to the period Δt of one PWM signal are memorized and the amount of phase shift when the data AN1 of the DC power supply voltage gets lowest is used as the most appropriate amount of shift. The inverter power generation apparatus is operated in the state where the phase of the PWM signals is shifted for the most appropriate amount of shift.

In order to correct the unbalance between the output of the inverter power generation apparatus and the output of the external power supply by shifting the phase of the PWM signals, there may be used a combination of the step of delaying the phase of the PWM signals and the step of advancing it.

For instance, when it is detected from the data AN1 of the DC power supply voltage of the inverter power generation apparatus that the DC power supply voltage gets equal to or more than the judgment value VH, the phase of the PWM signals is delayed just δt for every one cycle of the AC output voltage and whenever the phase is delayed every δt, the data AN1 of the DC power supply voltage is read. The thus read AN1 is compared with the former AN1 (the value prior to one cycle). As the result, if the value of AN1 gets smaller than the former value, the phase of the PWM signal is delayed by another δt. With the result that the processes are repeated, if the value of AN1 gets larger than the former value, the phase of the PWM signals is advanced by δt and the value of AN1 after the phase is advanced is compared with the former value. The processes are repeated until the DC power supply voltage obtained from the DC power supply section gets lower than the judgment value VH. The state where the DC power supply voltage VD gets lower than the judgment value VH is deemed as the state where the unbalance of the outputs is corrected and in this state the inverter power generation apparatus is operated.

With the aforementioned control performed, even though the balance between the output of the inverter power generation apparatus and the output of the external power supply collapses due to any cause, the balance can be restored or the state where the waveform, the crest value and the phase of the output voltage of the inverter power generation apparatus are coincident with those of the AC voltage obtained from the external power supply, respectively can be restored. Thus, the state where the current flows from the external power supply through the load connection terminals into the inverter circuit can be avoided.

In this case, the external power supply operated in parallel to the inverter power generation apparatus may be the inverter power generation apparatus having the same construction, other power generation apparatuses or a commercial power supply.

According to the invention, when the balance between the output of the inverter power generation apparatus and the output of the external power supply operated in parallel to the inverter power generation apparatus collapses due any cause and as a result, the current flows from the external power supply into the inverter power generation apparatus, the state is detected and the unbalance between them is corrected, which causes the inverter power generation apparatus and the external power supply to be able to be operated in parallel to each other without any trouble.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A method of controlling a parallel operation of two inverter power generation apparatuses each comprising an AC generator, a DC power supply section having a rectifier to rectify an output of said AC generator and a smoothing capacitor connected across DC output terminals of said smoothing capacitor to generate a DC power supply voltage across said smoothing capacitor, an inverter circuit having on-off controllable switch elements to convert said DC power supply voltage into an AC voltage by switching said switch elements, a filter circuit to remove a harmonic component from said output of said inverter circuit and load connection terminals across which an output of said filter circuit should be applied whereby said inverter circuit is controlled so as to output an AC voltage of desired frequency when no voltage is applied across said load connection terminals from an external power supply and to make a waveform, a crest value and a phase of said AC voltage output from said filter circuit coincident with those of the AC voltage applied from said external power supply, respectively, said method comprising the steps of detecting said DC power supply voltage of each of said inverter power generation apparatuses, limiting a load current of each of said inverter power generation apparatuses to a value equal to or less than the maximum rated load current allowed for outputting the AC voltage having no waveform distortion from each of said inverter power generation apparatuses when both of said DC power supply voltages of said two inverter power generation apparatuses are equal to or less than a judgment value set at a value equal to or more than a no-load output voltage of the corresponding DC power supply section and allowing said load current of one of said two inverter power generation apparatuses to exceed the value of said maximum rated load current when the DC power supply voltage of the other inverter power generation apparatus exceeds said judgment value.

2. A method of controlling a parallel operation of two inverter power generation apparatuses each comprising an AC generator, a DC power supply section having a rectifier to rectify an output of said AC generator and a smoothing capacitor connected across DC output terminals of said smoothing capacitor to generate a DC power supply voltage across said smoothing capacitor, an inverter circuit having on-off controllable switch elements to convert said DC power supply voltage into an AC voltage by switching said switch elements, a filter circuit to remove a harmonic component from said output of said inverter circuit, load connection terminals across which an output of said filter circuit should be applied and a controller to perform a PWM control in which a PWM signal is applied to control terminals of said switch elements of said inverter circuit so as to output from said inverter circuit the AC voltage of intermittent waveform having a duty value varying for every PWM cycle in accordance with an instant value of said AC output voltage applied to a load through, said load connection terminals and an overload protection control in which said output of the inverter circuit is stopped when the value of said DC power supply voltage gets lower than an overload judgment voltage value, said controller so constructed as to perform such a control as a waveform, a crest value and a phase of said AC output voltage applied across said load connection terminals from said inverter circuit when an external AC voltage is applied from an external AC power supply to said load connection terminals are made coincident with those of said external AC voltage, a power supply voltage judgment step being performed in which whether the detected DC power supply voltage of each of said inverter power generation apparatuses is equal to or less than a judgment value set at a value equal to or more than a no-load output voltage of said DC power supply section of each of said inverter power generation apparatuses or not is judged, whereby when it is judged in said power supply voltage judgment step that said DC power supply voltage is equal to or less than said judgment value, with the value of the DC power supply voltage when the maximum rated load current allowed for outputting the AC voltage having no waveform distortion through the load connection terminals of each of said inverter power generation apparatus flows through said inverter circuit of each of said inverter power generation apparatuses to the side of said load determined as the value of the minimum power supply voltage in the steady state, the value of said overload judgment voltage for said overload protection control of each of said inverter power generation apparatuses is set at the value equal to the value of said steady state minimum power supply voltage so that the load current of each of said inverter power generation apparatuses is prohibited from exceeding the value of said maximum rated load current and when it is judged in said power supply voltage judgment step that said DC power supply voltage of the one inverter power generation apparatus exceeds said judgment value, the value of said overload judgment voltage for said overload protection control of the other inverter power generation apparatus is set at the value further lower than the value of said steady state minimum power supply voltage so that an overload operation of the other inverter power generation apparatus is allowed.

3. A method of controlling a parallel operation of two inverter power generation apparatuses each comprising an AC generator, a DC power supply section having a rectifier to rectify an output of said AC generator and a smoothing capacitor connected across DC output terminals of said smoothing capacitor to generate a DC power supply voltage across said smoothing capacitor, an inverter circuit having on-off controllable switch elements to convert said DC power supply voltage into an AC voltage by switching said switch elements, a filter circuit to remove a harmonic component from said output of said inverter circuit, load connection terminals across which an output of said filter circuit should be applied and a controller to perform a PWM control in which a PWM signal is applied to control terminals of said switch elements of said inverter circuit so as to output from said inverter circuit the AC voltage of intermittent waveform having a duty value varying for every PWM cycle in accordance with an instant value of said AC output voltage applied to a load through said load connection terminals and an overload protection control in which said output of the inverter circuit is stopped when a load current exceeding a value of an overload judgment current flows through said inverter circuit, said controller so constructed as to perform such a control as a waveform, a crest value and a phase of said AC output voltage applied across said load connection terminals from said inverter circuit when an external AC voltage is applied from an external AC power supply to said load connection terminals are made coincident with those of said external AC voltage, a power supply voltage judgment step being performed in which whether the detected DC power supply voltage of each of a said inverter power generation apparatuses is equal to or less than a judgment value set at a value equal to or more than a no-load output voltage of said DC power supply section of each of said inverter power generation apparatuses or not is judged, whereby when it is judged in said power supply voltage judgment step that said DC power supply voltages of said two inverter power generation apparatuses are equal to or less than said judgment value set at the value equal to or more than the value of a no-load output voltage of the corresponding DC power supply section, the value of said overload judgment current of each of said inverter power generation apparatuses is set at the value equal to the value of said steady state maximum rated load current allowed for outputting said AC output voltage having no waveform distortion from the corresponding inverter power generation apparatus so that said load current of each of said inverter power generation apparatuses is prohibited from exceeding the value of said maximum rated load current and when it is judged in said power supply voltage judgment step that said DC power supply voltage of either of said inverter power generation apparatuses exceeds said judgment value, the value of said overload judgment current of the other inverter power generation apparatus is set at the value larger than the value of said maximum rated load current so that an overload operation of the other inverter power generation apparatus in which the load current thereof exceeds said maximum rated load current is allowed.

4. A method of controlling a parallel operation of two inverter power generation apparatuses each comprising an AC generator, a DC power supply section having a rectifier to rectify an output of said AC generator and a smoothing capacitor connected across DC output terminals of said smoothing capacitor to generate a DC power supply voltage across said smoothing capacitor, an inverter circuit having on-off controllable switch elements to convert said DC power supply voltage into an AC voltage by switching said switch elements, a filter circuit to remove a harmonic component from said output of said inverter circuit, load connection terminals across which an output of said filter circuit should be applied and a controller to perform a PWM control in which a PWM signal is applied to control terminals of said switch elements of said inverter circuit so as to output from said inverter circuit the AC voltage of intermittent waveform having a duty value "D" varying for every PWM cycle in accordance with an instant value of said AC output voltage applied to a load through said load connection terminals and an overload protection control in which said output of the inverter circuit is stopped when an overload current flows through said inverter circuit, said PWM control using as the duty value "D" the value obtained by multiplying a correction coefficient Kv by a reference duty value "Do" required for obtaining the predetermined waveform of said AC output voltage output from said load connection terminals and said controller being so formed that a waveform, a crest value and a phase of said AC output voltage applied across said load connection terminals from said inverter circuit are made coincident with those of an external AC voltage when said external AC voltage is applied from an external AC power supply across said load connection terminals, said AC generators having the same characteristic for said two inverter power generation apparatuses, a power supply voltage judgment step being performed in which whether the detected DC power supply voltages of the two inverter power generation apparatuses are equal to or less than a judgment value set at the value equal to or more than the no-load output voltage of said DC power supply section of the corresponding inverter power generation apparatuses or not is judged whereby it is judged in said power supply judgment step that both of said DC power supply voltages of said two inverter power generation apparatuses are equal to or less than the corresponding judgment value, ratios VA/VD and VA/VD' of a rated value VA of said crest value of said AC voltage output through said load connection terminals relative to said respective DC power supply voltages VD and VD' of said two inverter power generation apparatuses being used as said correction coefficient Kv for said PWM control of said two inverter power generation apparatuses, respectively and when it is judged in said power supply voltage judgment step that said DC power supply voltage VD of the one inverter power generation apparatus exceeds said judgment value, said ratio VA/VD' of the rated value VA of the crest value of the voltage across said load connection terminals relative to said DC power supply voltage VD' of the other inverter power generation apparatus being used as said correction coefficient Kv for the PWM control of the one inverter power generation apparatus.

5. A method of controlling a parallel operation of two inverter power generation apparatuses each comprising an AC generator, a DC power supply section having a rectifier to rectify an output of said AC generator and a smoothing capacitor connected across DC output terminals of said smoothing capacitor to generate a DC power supply voltage across said smoothing capacitor, an inverter circuit having on-off controllable switch elements to convert said DC power supply voltage into an AC voltage by switching said switch elements, a filter circuit to remove a harmonic component from said output of said inverter circuit, load connection terminals across which an output of said filter circuit should be applied and a controller to perform a PWM control in which a PWM signal is applied to control terminals of said switch elements of said inverter circuit so as to output from said inverter circuit the AC voltage of intermittent waveform having a duty value varying for every PWM cycle in accordance with an instant value of said AC output voltage applied to a load through said load connection terminals and an overload protection control in which said output of the inverter circuit is stopped when an overload current flows through said inverter circuit, said controller so constructed as to perform such a control as a waveform, a crest value and a phase of said AC output voltage applied across said load connection terminals from said inverter circuit when an external AC voltage is applied from an external AC power supply to said load connection terminals are made coincident with those of said external AC voltage, said method performing the simultaneous PWM control of said two inverter power generation apparatuses by applying a timing signal determining a start timing of every PWM cycle of said PWM control performed for one of said two inverter power generation apparatuses to the other inverter power generation apparatus and determining the start timing of every PWM cycle of said PWM control performed for the other inverter power generation apparatus on the timing signal applied from the one inverter power generation apparatus whereby the outputs of said two inverter power generation apparatuses are always balanced.

6. A method of controlling an operation of an inverter power generation apparatus comprising an AC generator, a DC power supply section having a rectifier to rectify an output of said AC generator and a smoothing capacitor connected across DC output terminals of said smoothing capacitor to generate a DC power supply voltage across said smoothing capacitor, an inverter circuit having on-off controllable switch elements to convert said DC power supply voltage into an AC voltage by switching said switch elements, a filter circuit to remove a harmonic component from said output of said inverter circuit, load connection terminals across which an output of said filter circuit should be applied and a controller to perform a PWM control in which a PWM signal is applied to control terminals of said switch elements of said inverter circuit so as to output from said inverter circuit the AC voltage of intermittent waveform having a duty value "D" varying for every PWM cycle in accordance with an instant value of said AC output voltage applied to a load through said load connection terminals and an overload protection control in which said output of the inverter circuit is stopped when an overload current flows through said inverter circuit, said PWM control using as the duty value "D" the value obtained by multiplying a correction coefficient Kv by a reference duty value "Do" required for obtaining the predetermined waveform of said AC output voltage output from said load connection terminals and said controller being so formed that a waveform, a crest value and a phase of said AC output voltage applied across said load connection terminals from said inverter circuit are made coincident with those of an external AC voltage when said external AC voltage is applied from an external AC power supply across said load connection terminals, a power supply voltage judgment step being performed in which whether the detected DC power supply voltage is equal to or less than a judgment value set at a value equal to or more than a no-load output voltage of said DC power supply section or not is judged, whereby when it is judged in said power supply judgment step that said DC power supply voltage is equal to or less than said judgment value, for said correction coefficient Kv is used the ratio VA/VD of the rated value VA of the crest value of the voltage output through said load connection terminals relative to the DC power supply voltage VD of said inverter power generation apparatus and when it is judged in said power supply judgment step that said DC power supply voltage exceeds said judgment value, for said correction coefficient Kv is used the ratio VA/VDo of the rated value VA relative to a provisional DC power supply voltage VDo set at a value equal to or less than the a no-load output voltage Vo of said DC power supply section.

7. A method of controlling an operation of an inverter power generation apparatus comprising an AC generator, a DC power supply section having a rectifier to rectify an output of said AC generator and a smoothing capacitor connected across DC output terminals of said smoothing capacitor to generate a DC power supply voltage across said smoothing capacitor, an inverter circuit having on-off controllable switch elements to convert said DC power supply voltage into an AC voltage by switching said switch elements, a filter circuit to remove a harmonic component from said output of said inverter circuit, load connection terminals across which an output of said filter circuit should be applied and a controller to perform a PWM control in which a PWM signal is applied to control terminals of said switch elements of said inverter circuit so as to output from said inverter circuit the AC voltage of intermittent waveform having a duty value "D" varying for every PWM cycle in accordance with an instant value of said AC output voltage applied to a load through said load connection terminals and an overload protection control in which said output of the inverter circuit is stopped when an overload current flows through said inverter circuit, said controller so constructed as to perform such a control as a waveform, a crest value and a phase of said AC output voltage applied across said load connection terminals from said inverter circuit when an external AC voltage is applied from an external AC power supply to said load connection terminals are made coincident with those of said external AC voltage, a power supply voltage judgment step being performed in which whether the detected DC power supply voltage of said inverter power generation apparatus is equal to or less than a judgment value set at a value equal to or more than a no-load output voltage of said DC power supply section or not is judged, whereby when it is judged in said power supply voltage judgment step that said DC power supply voltage exceeds said judgment value, a phase of said PWM signal applied to said control terminals of said switch elements of said inverter circuit is shifted until said DC power supply voltage gets equal to or less than said judgment value.

* * * * *